US012795317B2

(12) United States Patent
Hertensteiner et al.

(10) Patent No.: US 12,795,317 B2
(45) Date of Patent: Nov. 10, 2026

(54) OPTIMIZED VIRTUAL SPEAKER ARRAY

(71) Applicant: Magic Leap, Inc., Plantation, FL (US)

(72) Inventors: Mark Brandon Hertensteiner, Broken Arrow, OK (US); Remi Samuel Audfray, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 135 days.

(21) Appl. No.: 18/848,081

(22) PCT Filed: Mar. 25, 2022

(86) PCT No.: PCT/US2022/071356

§ 371 (c)(1),
(2) Date: Sep. 17, 2024

(87) PCT Pub. No.: WO2023/183053

PCT Pub. Date: Sep. 28, 2023

(65) Prior Publication Data

US 2025/0247666 A1 Jul. 31, 2025

(51) Int. Cl.
*H04S 7/00* (2006.01)
*H04R 5/04* (2006.01)

(52) U.S. Cl.
CPC ............... *H04S 7/303* (2013.01); *H04R 5/04* (2013.01); *H04S 2420/01* (2013.01)

(58) Field of Classification Search
CPC ........ H04R 5/04; H04S 7/303; H04S 2420/01
See application file for complete search history.

(56) References Cited

U.S. PATENT DOCUMENTS 4,852,988 A 8/1989 Velez
6,433,760 B1 8/2002 Vaissie
(Continued)

FOREIGN PATENT DOCUMENTS

CA 2316473 A1 1/2001
CA 2362895 A1 12/2002
(Continued)

OTHER PUBLICATIONS

Jacob, R. "Eye Tracking in Advanced Interface Design", Virtual Environments and Advanced Interface Design, Oxford University Press, Inc. (Jun. 1995).
(Continued)

*Primary Examiner* — Paul W Huber
(74) *Attorney, Agent, or Firm* — Tobias Intellectual Property Law, PLLC

(57) ABSTRACT

According to an example method, a location of a first virtual speaker array is determined. A first virtual speaker density is determined. Based on the first virtual speaker density, a location of a second virtual speaker of the first virtual speaker array is determined. A source location in a virtual environment is determined for an audio signal. A virtual speaker of the first virtual speaker array is selected based on the source location and based further on a position or an orientation of a listener in the virtual environment. A head-related transfer function (HRTF) is identified that corresponds to the selected virtual speaker of the first virtual speaker array. The HRTF is applied to the audio signal to produce a first filtered audio signal. The first filtered audio signal is presented to the listener via a first speaker.

14 Claims, 19 Drawing Sheets

(56) References Cited

U.S. PATENT DOCUMENTS

| | | | |
|---|---|---|---|
| 6,491,391 B1 | 12/2002 | Blum et al. | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,347,551 B2 | 3/2008 | Fergason et al. | |
| 7,488,294 B2 | 2/2009 | Torch | |
| 8,235,529 B1 | 8/2012 | Raffle | |
| 8,611,015 B2 | 12/2013 | Wheeler | |
| 8,638,498 B2 | 1/2014 | Bohn et al. | |
| 8,696,113 B2 | 4/2014 | Lewis | |
| 8,929,589 B2 | 1/2015 | Publicover et al. | |
| 9,010,929 B2 | 4/2015 | Lewis | |
| 9,274,338 B2 | 3/2016 | Robbins et al. | |
| 9,292,973 B2 | 3/2016 | Bar-zeev et al. | |
| 9,323,325 B2 | 4/2016 | Perez et al. | |
| 9,485,600 B2 | 11/2016 | Nakano | |
| 9,720,505 B2 | 8/2017 | Gribetz et al. | |
| 9,992,602 B1 | 6/2018 | Allen | |
| 10,013,053 B2 | 7/2018 | Cederlund et al. | |
| 10,025,379 B2 | 7/2018 | Drake et al. | |
| 2003/0030597 A1 | 2/2003 | Geist | |
| 2006/0023158 A1 | 2/2006 | Howell et al. | |
| 2011/0211056 A1 | 9/2011 | Publicover et al. | |
| 2011/0213664 A1 | 9/2011 | Osterhout | |
| 2012/0021806 A1 | 1/2012 | Maltz | |
| 2013/0077147 A1 | 3/2013 | Efimov | |
| 2014/0195918 A1 | 7/2014 | Friedlander | |
| 2015/0168731 A1 | 6/2015 | Robbins | |
| 2018/0213341 A1 | 7/2018 | Yang et al. | |
| 2020/0112815 A1* | 4/2020 | Audfray | H04S 7/304 |
| 2021/0266696 A1 | 8/2021 | Lee et al. | |
| 2022/0038840 A1 | 2/2022 | Audfray et al. | |
| 2023/0209294 A1* | 6/2023 | Brodersen | H04S 7/304 381/303 |

FOREIGN PATENT DOCUMENTS

| | | |
|---|---|---|
| CA | 2388766 A1 | 12/2003 |
| CN | 110120229 A | 8/2019 |

OTHER PUBLICATIONS

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

International Preliminary Report on Patentability and Written Opinion mailed Oct. 10, 2024, for PCT Application No. PCT/US2022/071356, filed Mar. 25, 2022, eight pages.

EP22933858.7 Extended European Search Report dated Dec. 3, 2025.

* cited by examiner

OPTIMIZED VIRTUAL SPEAKER ARRAY

CROSS REFERENCE TO RELATED APPLICATIONS

This application is a U.S. national stage application under 35 U.S.C. § 371 of International Application No. PCT/US2022/071356, filed internationally on Mar. 25, 2022.

FIELD

This disclosure relates generally to systems and methods for audio signal processing, and in particular to systems and methods for presenting audio signals in virtual environments.

BACKGROUND

Augmented reality and mixed reality systems place unique demands on the presentation of binaural audio signals to a user, such as in wearable head devices that feature left and right headphones. On one hand, presentation of audio signals in a realistic manner—for example, in a manner consistent with the user's expectations—is crucial for creating augmented or mixed reality environments that are immersive and believable. On the other hand, the computational expense of processing such audio signals can be prohibitive, particularly for mobile systems that may feature limited processing power and battery capacity. A challenge for augmented reality and mixed reality systems is to improve the fidelity and immersiveness of such audio signals while working within computational resource constraints.

One particular challenge is the presentation of spatialized audio events in a virtual environment (i.e., a virtual environment used in a virtual reality, augmented reality, or mixed reality system). Spatialized audio events can be associated with locations that are fixed relative to the virtual environment, such that when a listener moves or rotates his or her head relative to the virtual environment, audio signals associated with an audio event will change to reflect the changing location of the audio event with respect to the listener. Creating convincing immersive audio in a virtual environment requires that these spatialized audio signals be consistent with the listener's expectations: that is, for audio signals that emanate from a particular location in a virtual environment to be convincing to the listener, they must sound to the listener as if they are actually emanating from that location.

One mechanism for spatializing audio signals involves the head-related transfer function (HRTF). A HRTF can be associated with a specific location, which may be described as a virtual speaker, in a virtual environment. Applying a HRTF to an audio signal can produce a filtered audio signal that sounds, to the listener, as if it emanates from the corresponding virtual speaker location in the virtual environment. Virtual speakers can be organized into groups called virtual speaker arrays (VSAs).

However, in some VSAs, virtual speakers are distributed within the VSA in a suboptimal manner. When no virtual speaker in a VSA is sufficiently close to the source of an audio signal in a virtual environment, the quality of the resulting spatialized audio can be suboptimal. It would be desirable to generate an optimized VSA, in which virtual speakers are distributed such that the expected audio quality is improved. At the same time, because HRTFs can impose a significant computational load, it would be desirable to distribute the virtual speakers within the VSA without unduly increasing the overall number of virtual speakers.

BRIEF SUMMARY

Examples of the disclosure describe systems and methods relating to presenting audio signals. According to an example method, a location of a first virtual speaker of a first virtual speaker array is determined. A first virtual speaker density is determined. Based on the first virtual speaker density, a location of a second virtual speaker of the first virtual speaker array is determined. A source location in a virtual environment is determined for an audio signal. A virtual speaker of the first virtual speaker array is selected based on the source location and based further on a position or an orientation of a listener in the virtual environment. A head-related transfer function (HRTF) is identified that corresponds to the selected virtual speaker of the first virtual speaker array. The HRTF is applied to the audio signal to produce a first filtered audio signal. The first filtered audio signal is presented to the listener via a first speaker.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 1:
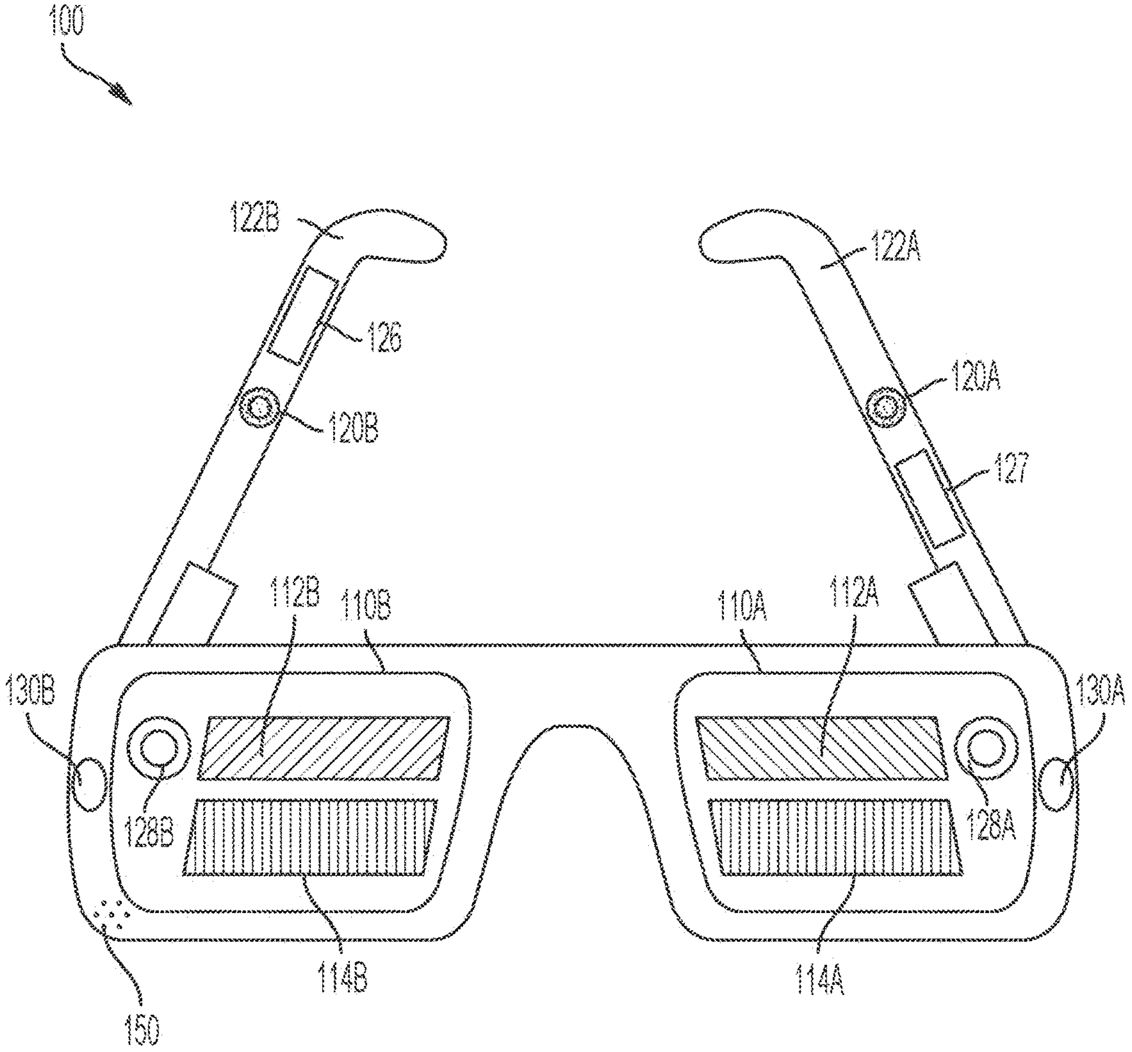
FIG. 1 illustrates an example wearable system, according to some embodiments of the disclosure.

FIG. 1 illustrates an example wearable head device 100 configured to be worn on the head of a user. Wearable head device 100 may be part of a broader wearable system that includes one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can include one or more displays, such as displays 110A and 110B (which may include left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMUs, e.g. IMU 126), acoustic sensors (e.g., microphones 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements) (e.g., eye cameras 128A and 128B). However, wearable head device 100 can incorporate any suitable display technology, and any suitable number, type, or combination of sensors or other components without departing from the scope of the disclosure. In some examples, wearable head device 100 may incorporate one or more microphones 150 configured to detect audio signals generated by the user's voice; such microphones may be positioned adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
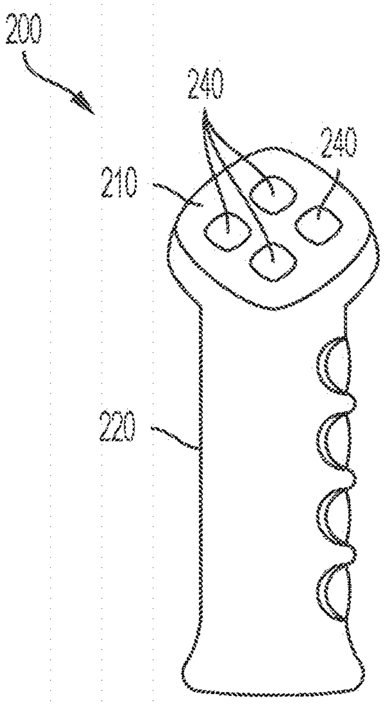
FIG. 2 illustrates an example handheld controller that can be used in conjunction with an example wearable system, according to some embodiments of the disclosure.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200—which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
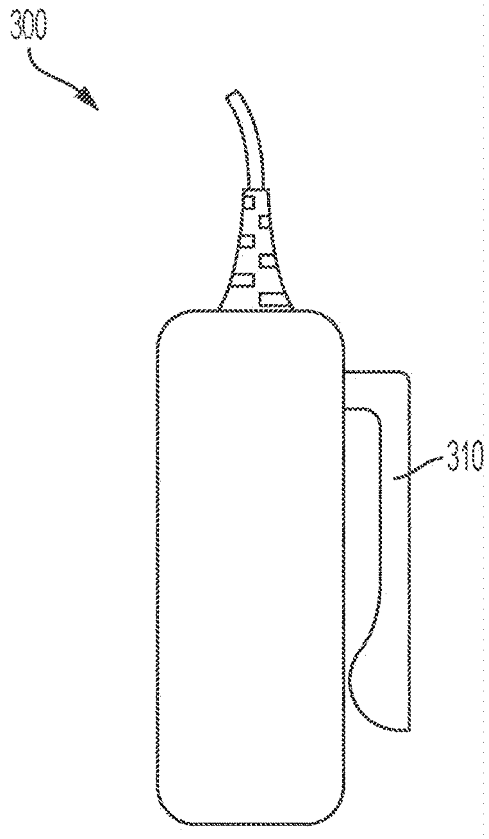
FIG. 3 illustrates an example auxiliary unit that can be used in conjunction with an example wearable system, according to some embodiments of the disclosure.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
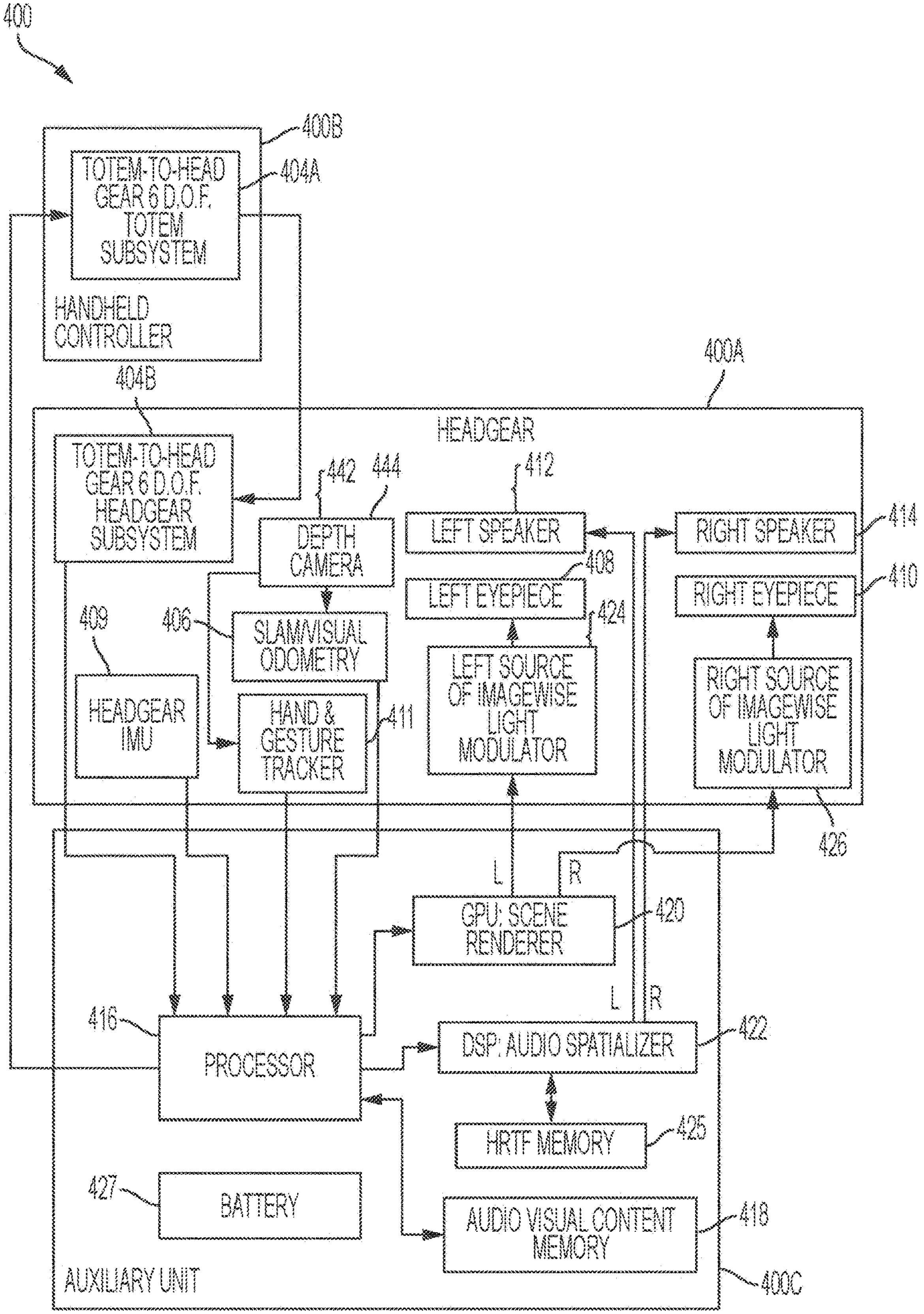
FIG. 4 illustrates an example functional block diagram for an example wearable system, according to some embodiments of the disclosure.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include example handheld controller 400B, referred to here as a "totem" (and which may correspond to handheld controller 200 described above); the handheld controller 400B can include a totem-to-headgear six degree of freedom (6DOF) totem subsystem 404A. Wearable system 400 can also include example headgear device 400A (which may correspond to wearable head device 100 described above); the headgear device 400A includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the headgear device 400A. The six degrees of freedom may be expressed relative to a coordinate system of the headgear device 400A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 444 (and/or one or more non-depth cameras) included in the headgear device 400A; and/or one or more optical targets (e.g., buttons 240 of handheld controller 200 as described above, or dedicated optical targets included in the handheld controller) can be used for 6DOF tracking. In some examples, the handheld controller 400B can include a camera, as described above; and the headgear device 400A can include an optical target for optical tracking in conjunction with the camera. In some examples, the headgear device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the handheld controller 400B relative to the headgear device 400A may be determined. In some examples, 6DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to headgear device 400A) to an inertial coordinate space, or to an environmental coordinate space. For instance, such transformations may be necessary for a display of headgear device 400A to present a virtual object at an expected position and orientation relative to the real environment (e.g., a virtual person sitting in a real chair, facing forward, regardless of the position and orientation of headgear device 400A), rather than at a fixed position and orientation on the display (e.g., at the same position in the display of headgear device 400A). This can maintain an illusion that the virtual object exists in the real environment (and does not, for example, appear positioned unnaturally in the real environment as the headgear device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the headgear device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of headgear device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of headgear device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, microphones 450; and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to headgear device 400A and/or handheld controller 400B. Including such components in an auxiliary unit, which can be mounted to a user's waist, can limit the size and weight of headgear device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Audio Rendering

The systems and methods described below can be implemented in a virtual reality, augmented reality, or mixed reality system, such as described above. For example, one or more processors (e.g., CPUs, DSPs) of an augmented reality system can be used to process audio signals or to implement steps of computer-implemented methods described below; sensors of the augmented reality system (e.g., cameras, acoustic sensors, IMUs, LIDAR, GPS) can be used to determine a position and/or orientation of a user of the system, or of elements in the user's environment; and speakers of the augmented reality system can be used to present audio signals to the user. In some embodiments, external audio playback devices (e.g. headphones, earbuds) could be used instead of the system's speakers for delivering the audio signal to the user's ears. The user may be considered a "listener" of the system.

In virtual reality, augmented reality, or mixed reality systems such as described above, one or more processors (e.g., DSP audio spatializer 422) can process one or more audio signals for presentation to a user of a wearable head device via one or more speakers (e.g., left and right speakers 412/414 described above). Processing of audio signals requires tradeoffs between the authenticity of a perceived audio signal—for example, the degree to which an audio signal presented to a user in a mixed reality environment matches the user's expectations of how an audio signal would sound in a real environment—and the computational overhead involved in processing the audio signal.

In some systems, one or more virtual speaker arrays (VSAs) are associated with a listener. A VSA may include a discrete set of virtual speaker positions relative to a particular position and/or orientation. A virtual speaker position can be described in spherical coordinates, i.e., azimuth, elevation, and distance, or in other suitable coordinates. These coordinates may be expressed relative to a center point (which may be a center of one of the listener's ears, or a center of the listener's head); and/or relative to a base orientation (which may be a vector representing a forward-facing direction of the listener, or a vector representing an orientation of an ear of the listener). In examples where the VSA includes virtual speaker positions located on the surface of a sphere, the distance coordinates for each virtual speaker position will be constant (e.g., 1 meter or 0.25 meters, corresponding to the radius of the sphere). In some examples, two VSAs may be used-one corresponding to each of a listener's ears.

A HRTF corresponding to a virtual speaker position can represent a filter that can be applied to an audio signal to create, for the listener, the auditory perception that the audio signal emanates from the location of that virtual speaker. In some examples, a HRTF may be specific to a left ear or to a right ear. That is, a left-ear HRTF for a virtual speaker position, when applied to an audio signal, creates for the left ear the auditory perception that the audio signal emanates from the location of that virtual speaker. Similarly, when a right-ear HRTF for that virtual speaker position is applied to an audio signal, it creates for the right ear the auditory perception that the audio signal emanates from that same location.

A HRTF can express signal amplitude as a function of one or more of azimuth, elevation, distance, and frequency (with azimuth, elevation, and distance expressed relative to a base position and/or orientation). For example, a HRTF can represent a signal amplitude as a function of azimuth, elevation, distance, and frequency. For a particular azimuth, elevation, and distance, a HRTF can represent a signal amplitude as a function of frequency. For a particular azimuth, elevation, and distance, relative to a base position and orientation, a HRTF can represent a signal amplitude as a function of frequency. For a particular elevation and distance, a HRTF can represent a signal amplitude as a function of frequency and azimuth. Similarly, for a particular distance, a HRTF can represent a signal amplitude as a function of frequency, azimuth, and elevation. (This expression may be common as a result of a HRTF determination process in which HRTFs are measured at various locations positioned a fixed distance from a listener.)

In some examples, HRTFs may be retrieved from a database (e.g., the SADIE binaural database) by a wearable head device. In some examples, HRTFs may be stored locally with respect to the wearable head device.

In some examples, for each virtual speaker position, a pair (e.g., left-right pair) of HRTFs can be provided. A left HRTF of the pair of HRTFs may be applied to an audio signal at the position to generate a filtered audio signal for the left ear. Similarly, a right HRTF of the pair of HRTFs may be applied to the audio signal to generate a filtered audio signal for the right ear. In such systems, the VSA can be described as symmetric with respect to the left and right ears: although different left and right HRTFs may be provided for each virtual speaker, because there is only a single VSA, the locations of the virtual speakers within the VSA are identical for both the left ear and the right ear.

A distance from a center point (e.g., a location of a listener's ear, or a center of the listener's head) to a VSA may correspond to a distance at which the HRTFs were obtained. In some examples, HRTFs may be measured or synthesized from simulation. A measured/simulated distance from the VSA to the center point may be referred to as "measured distance" (MD). A distance from a virtual sound source to the center point may be referred to as "source distance" (SD).

Figure 5:
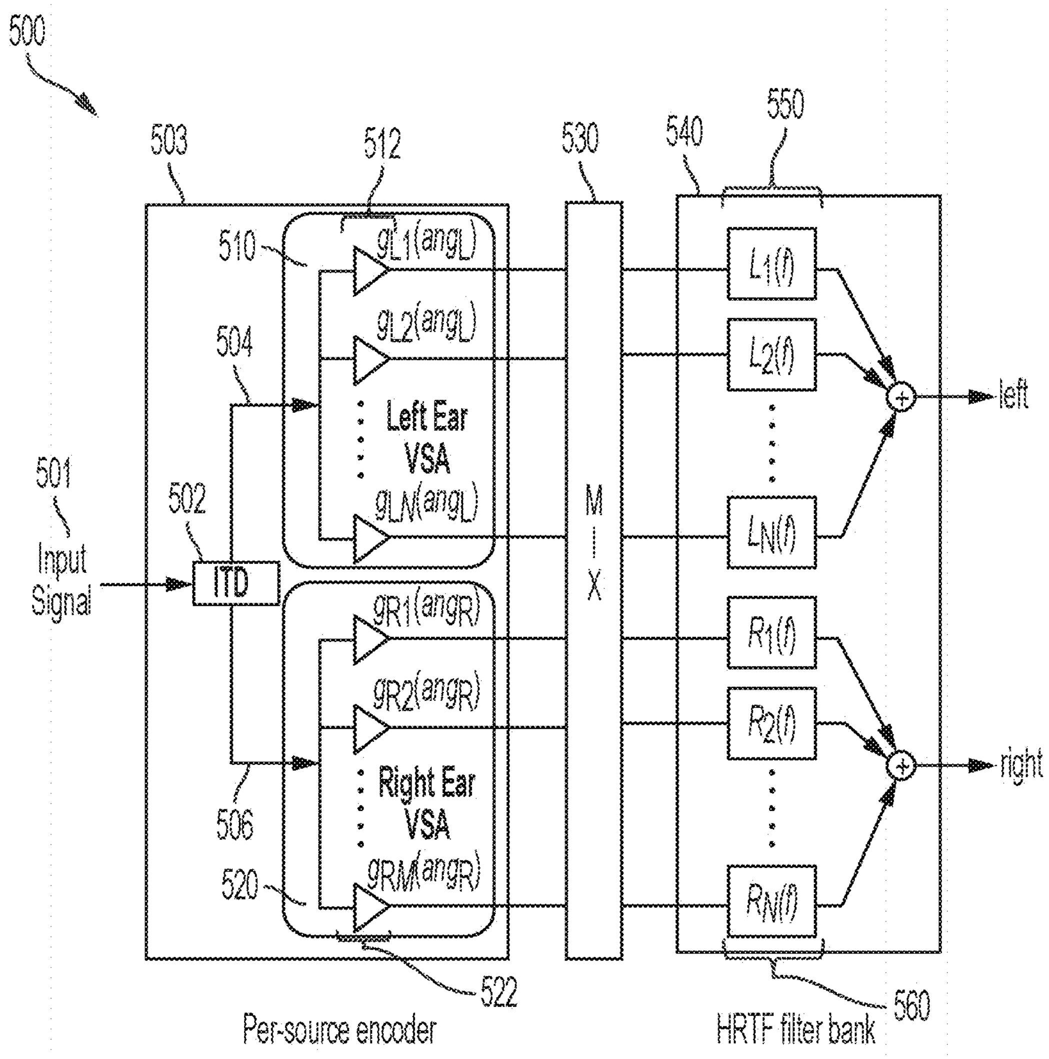
FIG. 5 illustrates a binaural rendering system, according to some embodiments of the disclosure.

FIG. 5 illustrates a rendering system 500, according to some embodiments. In the example system of FIG. 5, an input audio signal 501 (which can be associated with a virtual sound source) is split by an interaural time delay (ITD) module 502 of an encoder 503 into a left signal 504 and a right signal 506. In some examples, the left signal 504 and the right signal 506 may differ by an ITD (e.g., in milliseconds) determined by the ITD module 502. In the example, the left signal 504 is input to a left ear VSA module 510 and the right signal 506 is input to a right ear VSA module 520. In some examples, left ear VSA module 510 and right ear VSA module 520 may refer to the same VSA (e.g., a single VSA that comprises the same virtual speakers at the same positions). In some examples, left ear VSA module 510 and right ear VSA module 520 may refer to different VSAs (e.g., two VSAs that comprise different virtual speakers at different positions).

In the example, the left ear VSA module 510 can pan the left signal 504 over a set of N channels respectively feeding a set of left-ear HRTF filters 550 ($L_1, \ldots L_N$) in a HRTF filter bank 540. The left-ear HRTF filters 550 may be substantially delay-free. Panning gains 512 ($g_{L1}, \ldots g_{LN}$) of the left ear VSA module may be functions of a left incident angle ($ang_L$). The left incident angle may be indicative of a direction of incidence of sound relative to a frontal direction from the center of the listener's head. The left incident angle can comprise an angle in three dimensions; that is, the left incident angle can include an azimuth and/or an elevation angle.

Similarly, in the example, the right ear VSA module 520 can pan the right signal 506 over a set of M channels respectively feeding a set of right-ear HRTF filters 560 ($R_1$, . . . $R_M$) in the HRTF filter bank 540. The right-ear HRTF filters 550 may be substantially delay-free. (Although only one HRTF filter bank is shown in the figure, multiple HRTF filter banks, including those stored across distributed systems, are contemplated.) Panning gains 522 ($g_{R1}$, . . . $g_{RM}$) of the right ear VSA module may be functions of a right incident angle ($ang_R$). The right incident angle may be indicative of a direction of incidence of sound relative to the frontal direction from the center of the listener's head. As above, the right incident angle can comprise an angle in three dimensions; that is, the right incident angle can include an azimuth and/or an elevation angle.

In some embodiments, such as shown, the left ear VSA module 510 may pan the left signal 504 over N channels and the right ear VSA module 520 may pan the right signal over M channels. In some embodiments, N and M may be equal. In some embodiments, N and M may be different. In these embodiments, the left ear VSA module 510 may feed into a set of left-ear HRTF filters ($L_1$, . . . $L_N$) and the right ear VSA module may feed into a set of right-ear HRTF filters ($R_1$, . . . $R_M$), as described above. Further, in these embodiments, panning gains ($g_{L1}$, . . . $g_{LN}$) of the left ear VSA module 510 may be functions of a left ear incident angle ($ang_L$) and panning gains ($g_{R1}$, . . . $g_{RM}$) of the right ear VSA module 520 may be functions of a right ear incident angle ($ang_R$), as described above.

Each of the N channels may correspond to a virtual speaker of the left ear VSA module 510. Likewise, each of the M channels may correspond to a virtual speaker of the right ear VSA module 520. Further, each virtual speaker (and thus each channel) may correspond to a HRTF filter. In the example shown in the figure, with respect to left ear VSA module 510, virtual speaker LN corresponds to gain $g_{LN}$ and HRTF $L_N$(f). Similarly, with respect to right ear VSA module 520, virtual speaker RM corresponds to gain $g_{RM}$ and HRTF $R_M$(f). Each HRTF is associated with a position of its corresponding virtual speaker. By adjusting the gains associated with each virtual speaker, the encoder is able to blend the influence of each HRTF on an output signal (e.g., the left and right outputs shown in the figure). Assigning a non-zero gain to a channel may be viewed as selecting a virtual speaker corresponding to that channel.

The example system illustrates a single encoder 503 and corresponding input signal 501. The input signal may correspond to a virtual sound source. In some embodiments, the system may include additional encoders and corresponding input signals. In these embodiments, the input signals may correspond to virtual sound sources. That is, each input signal may correspond to a virtual sound source.

In some embodiments, when simultaneously rendering several virtual sound sources, the system may include an encoder per virtual sound source. In these embodiments, a mix module (e.g., 530 in FIG. 5) receives outputs from each of the encoders, mixes the received signals, and outputs mixed signals to the left and right HRTF filters of the HRTF filter bank.

Figure 6A:
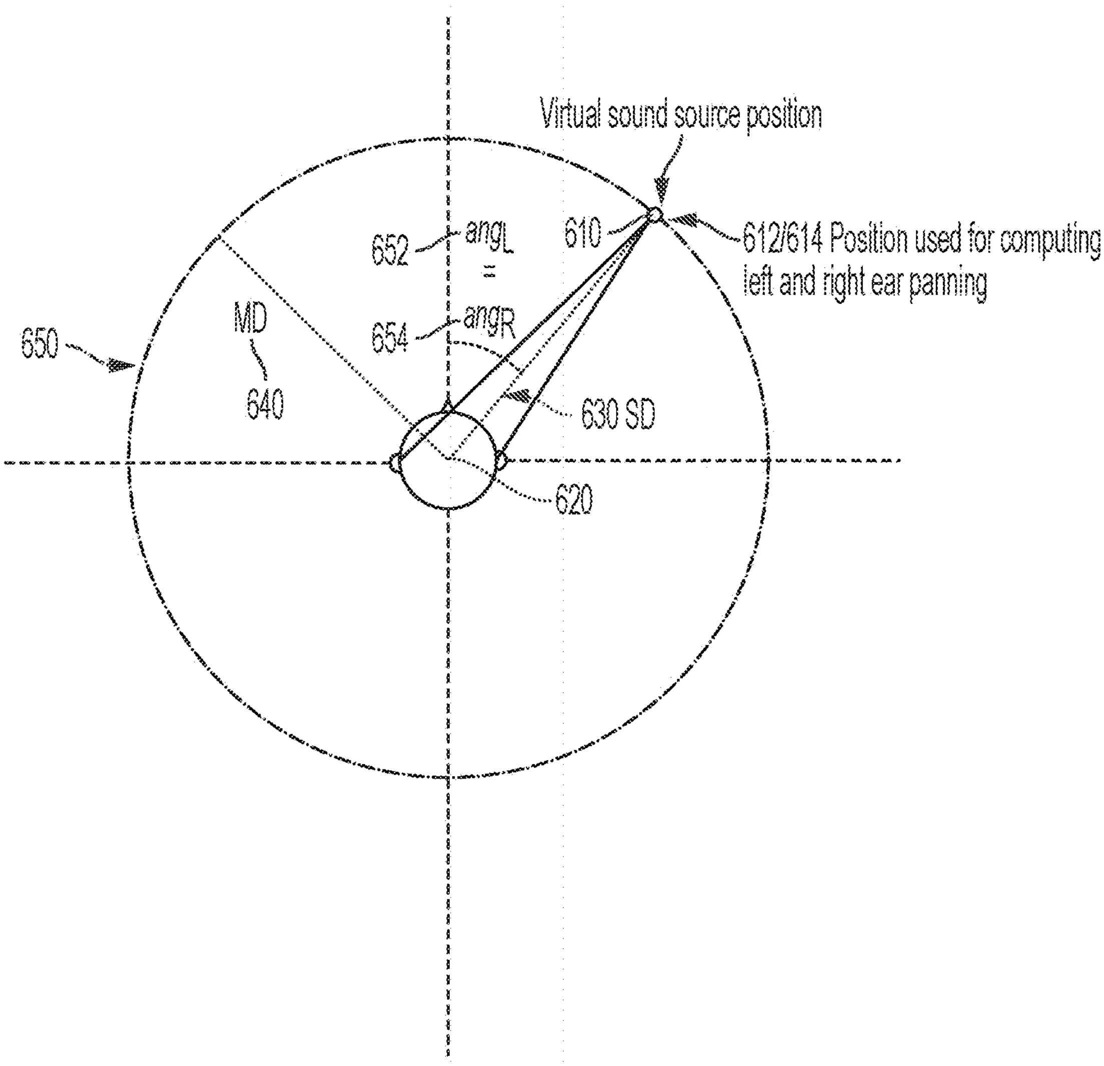
FIGS. 6A-6C illustrate example geometry of modeling audio effects from a virtual sound source, according to some embodiments of the disclosure.

FIG. 6A illustrates a geometry for modeling audio effects from a virtual sound source, according to some embodiments. A distance 630 of the virtual sound source 610 to a center 620 of a listener's head (e.g., "source distance" (SD)) is equal to a distance 640 from a spherical VSA 650 to a center point (e.g., "measured distance" (MD)). As illustrated in FIG. 6A, a left incident angle 652 ($ang_L$) and a right incident angle 654 ($ang_R$) are equal. In some embodiments, an angle from the center 620 to the virtual sound source 610 may be used directly for computing panning gains (e.g., $g_{L1}$, . . . , $g_{LN}$, $g_{R1}$, . . . , $g_{RN}$). In the example shown, the virtual sound source position 610 is used as the position (612/614) for computing left ear panning and right ear panning.

Figure 6B:
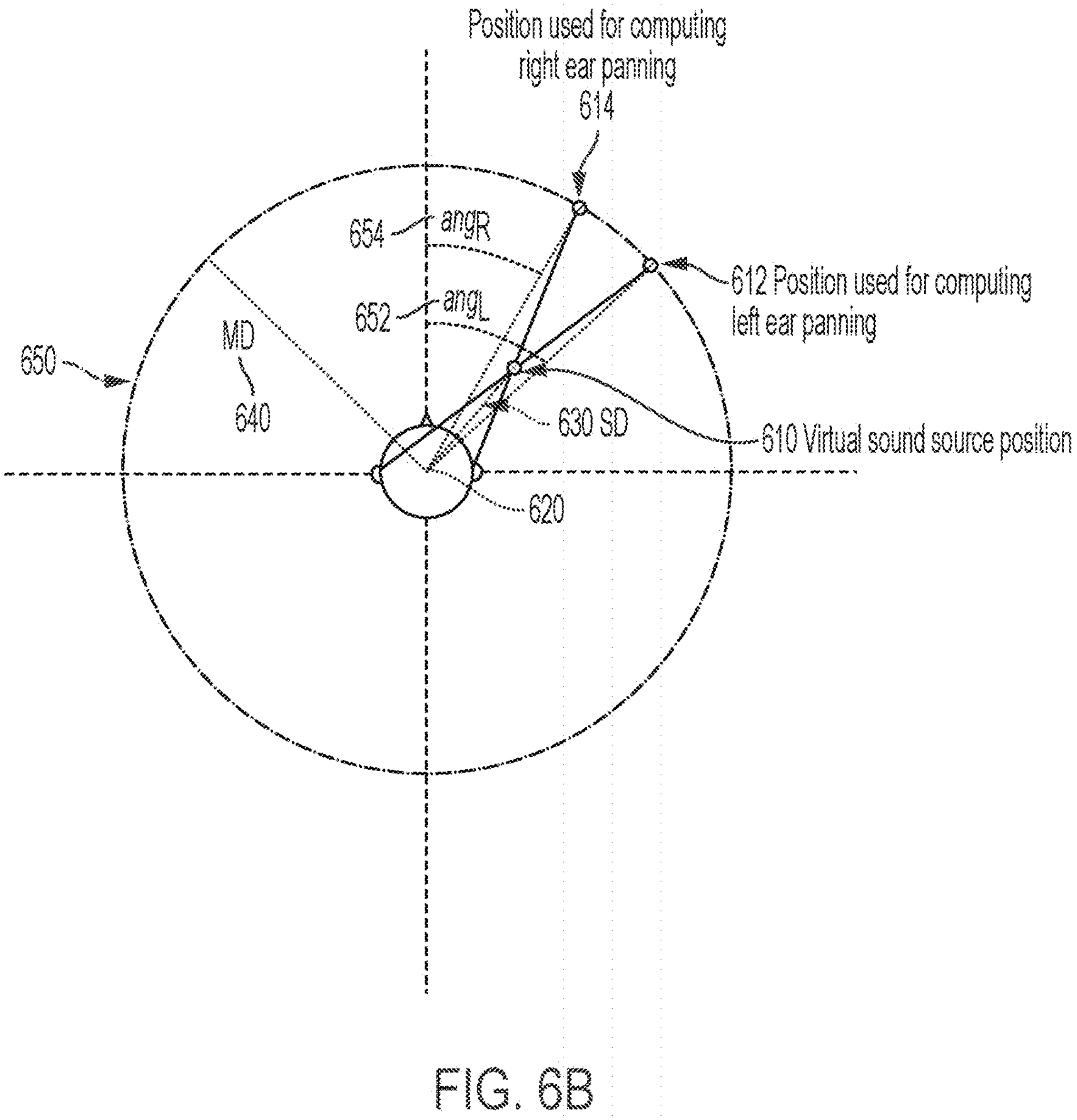

FIG. 6B illustrates a geometry for modeling near-field audio effects from a virtual sound source, according to some embodiments. As shown, a distance 630 from the virtual sound source 610 to a reference point (e.g., "source distance" (SD)) is less than a distance 640 from a VSA 650 to the center 620 (e.g., "measured distance" (MD)). In some embodiments, the reference point may be a center of a listener's head (620). In some embodiments, the reference point may be a mid-point between two ears of the listener. In some embodiments, the reference point may be a location of an ear of the listener. As illustrated in FIG. 6B, a left incident angle 652 ($ang_L$) is greater than a right incident angle 654 ($ang_R$). Angles relative to each ear (e.g., the left incident angle 652 ($ang_L$) and the right incident angle 654 ($ang_R$)) are different than at the MD 640.

In some embodiments, the left incident angle 652 ($ang_L$) used for computing a left ear signal panning may be derived by computing an intersection of a line going from the listener left ear through a location of the virtual sound source 610, and a sphere containing the VSA 650. A panning angle combination (azimuth and elevation) may be computed for 3D environments as a spherical coordinate angle from the center 620 of the listener's head to the intersection point.

Similarly, in some embodiments, the right incident angle 654 ($ang_L$) used for computing a left ear signal panning may be derived by computing an intersection of a line going from the listener right ear through the location of the virtual sound source 610, and the sphere containing the VSA 650. A panning angle combination (azimuth and elevation) may be computed for 3D environments as a spherical coordinate angle from the center 620 of the listener's head to the intersection point.

In some embodiments, an intersection between a line and a sphere may be computed, for example, by combining an equation representing the line and an equation representing the sphere.

Figure 6C:
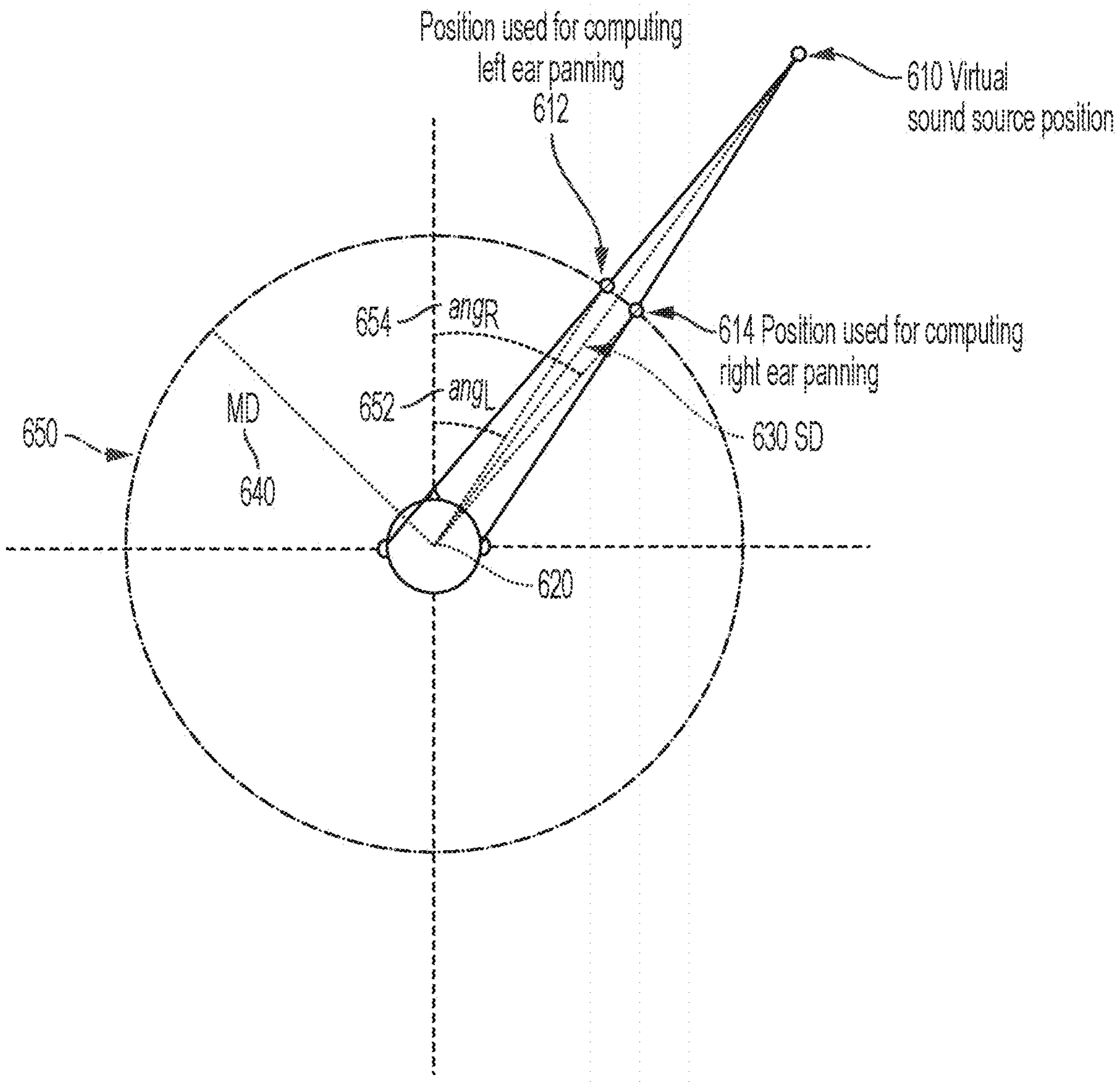

FIG. 6C illustrates a geometry for modeling far-field audio effects from a virtual sound source, according to some embodiments. A distance 630 of the virtual sound source 610 to a center 620 (e.g., "source distance" (SD)) is greater than a distance 640 from a VSA 650 to the center 620 (e.g., "measured distance" (MD)). As illustrated in FIG. 6C, a left incident angle 612 ($ang_L$) is less than a right incident angle 614 ($ang_R$). Angles relative to each ear (e.g., the left incident angle ($ang_L$) and the right incident angle ($ang_R$)) are different than at the MD.

In some embodiments, the left incident angle 612 ($ang_L$) used for computing a left ear signal panning may be derived by computing an intersection of a line going from the listener's left ear through a location of the virtual sound source 610, and a sphere containing the VSA 650. A panning angle combination (azimuth and elevation) may be computed for 3D environments as a spherical coordinate angle from the center 620 to the intersection point.

Similarly, in some embodiments, the right incident angle 614 ($ang_R$) used for computing a left ear signal panning may be derived by computing an intersection of a line going from the listener's right ear through the location of the virtual sound source 610, and the sphere containing the VSA 650.

A panning angle combination (azimuth and elevation) may be computed for 3D environments as a spherical coordinate angle from the center 620 to the intersection point.

In some embodiments, an intersection between a line and a sphere may be computed, for example, by combining an equation representing the line and an equation representing the sphere.

In some embodiments, rendering schemes may not differentiate the left incident angle 612 and the right incident angle 614, and instead assume the left incident angle 612 and the right incident angle 614 are equal. However, assuming the left incident angle 612 and the right incident angle 614 are equal may not be applicable or acceptable when reproducing near-field effects as described with respect to FIG. 6B and/or far-field effects as described with respect to FIG. 6C.

As described above, the per-channel gains of FIG. 5 (e.g., $g_{L1}, \ldots, g_{LN}, g_{R1}, \ldots, g_{RN}$), which may be computed according to the techniques described above for FIGS. 6A-6C, can determine the contributions of their corresponding HRTFs to an output signal. As described above, each HRTF can correspond to one channel and one virtual speaker position. That is, the HRTF represents a filter that spatializes an audio signal to make it sound as if it emanates from that virtual speaker position. Where a virtual sound source position for an audio signal is identical to a virtual speaker position, a HRTF corresponding to that virtual speaker may be applied to the audio signal. HRTFs are weighted according to their corresponding gains. For example, a virtual speaker position that is closer to the virtual sound source position may be weighted more strongly (i.e., with a higher gain) than a virtual speaker position that is farther from the virtual sound source position. A virtual speaker with a non-zero gain may be viewed as a virtual speaker that has been selected for presentation. Ideally, the listener will perceive the filtered audio signal, which incorporates the HRTFs corresponding to selected virtual speakers, as emanating from the virtual sound source.

The most desirable audio results—that is, the output audio signals that most convincingly present, to the user, sounds that appear to emanate from the virtual sound source position—can be obtained when the virtual sound source position overlaps with (or is very close to) a virtual speaker position. This is because the filtering applied to the input audio signal is dominated by a single HRTF that is designed to correspond to a single virtual speaker that is close to the virtual sound source position. The farther a virtual sound source is from a virtual speaker, the less the virtual sound source will correspond to a single HRTF, and, in many cases, the less convincing the resulting audio outputs will be.

Figure 7A:
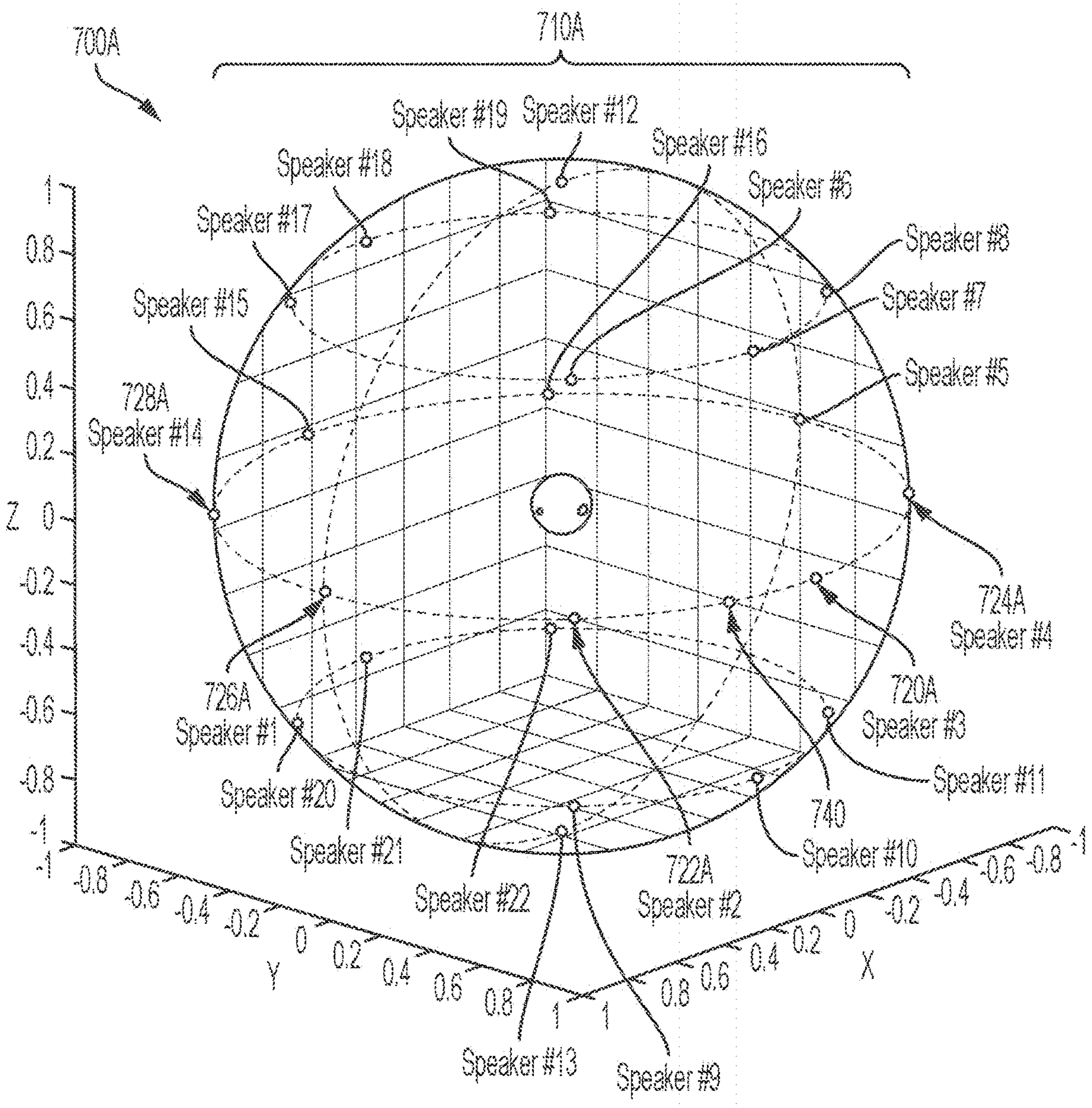
FIGS. 7A-7B illustrate examples of virtual speaker arrays, according to some embodiments of the disclosure.

FIG. 7A illustrates an example VSA 700A in which virtual speakers 710A (labeled in the figure as Speaker #1, Speaker #2, and so on) are disposed on the surface of a sphere. VSA 700A may correspond to a VSA referenced by VSA modules 510 or 520 from FIG. 5. In VSA 700A, virtual speakers are spaced evenly with uniform density with respect to azimuth. For example, virtual speaker 720A has an azimuth of 90 degrees and an elevation of 0 degrees. Virtual speaker 722A has an azimuth of 45 degrees and an elevation of 0 degrees. Virtual speaker 724A has an azimuth of 135 degrees and an elevation of 0 degrees. Virtual speaker 726A has an azimuth of 0 degrees and an elevation of 0 degrees. And virtual speaker 728A has an azimuth of −45 degrees and an elevation of 0 degrees. These five virtual speakers have the same elevation and differ by a constant 45 degrees in azimuth.

As described above, the quality of a filtered audio signal will be lower as the distance of the audio signal's virtual sound source from a nearby virtual speaker increases. In the figure, example virtual sound source 740, which has an azimuth of 65 degrees and an elevation of 0 degrees, is not located near any of the virtual speakers in VSA 700A: for example, the two nearest virtual speakers at elevation 0 degrees are 720A (having an azimuth of 90 degrees, 25 degrees away from virtual sound source 740) and 722A (having an azimuth of 45 degrees, 20 degrees away from virtual sound source 740). The quality of a filtered audio signal for virtual sound source 740 will be suboptimal, because there is no HRTF that corresponds to the location of virtual sound source 740 (or a location sufficiently close to it). If VSA 700 included a virtual speaker that overlapped with virtual sound source 740, or was located close to virtual sound source 740, the quality of the filtered audio signal would be improved.

Generally speaking, higher quality audio results can be obtained by increasing the number of virtual speakers in a VSA. This is because, with a larger number of virtual speakers, the more likely it is that a virtual sound source (such as virtual sound source 740 in the above example) is located at or near one of the virtual speakers. However, increasing the number of virtual speakers, and their corresponding HRTFs, is limited by constraints on computational resources. HRTFs are computationally intensive, and simply increasing their number may be prohibitive.

One way to optimize the expected audio quality of spatialized audio signals, without increasing the number of virtual speakers (and thus HRTFs and computational load), is by adjusting a density (e.g., a closeness) of virtual speakers in a VSA. That is, for more significant regions of the VSA (such as where virtual sound sources are more likely to be located), virtual speakers can be placed at a higher density, increasing the likelihood that, for an audio signal, the audio signal's virtual sound source is located at or near a virtual speaker of the VSA. Conversely, for less significant regions of the VSA, virtual speakers can be placed at a lower density, balancing the higher density regions and reducing or eliminating the need to increase the total number of virtual speakers of the VSA.

In some examples, a virtual speaker density can refer to a density of virtual speakers in an azimuthal dimension. In some examples, a virtual speaker density can refer to a density of virtual speakers in an elevation dimension. In some examples, a virtual speaker density can refer to a density of virtual speakers in a distance dimension. A virtual speaker density can also refer to a density of virtual speakers in two or more of the above dimensions (e.g., azimuth and elevation), or a density of virtual speakers in other suitable dimensions (e.g., x, y, and/or z axes in rectangular coordinate systems).

Figure 7B:
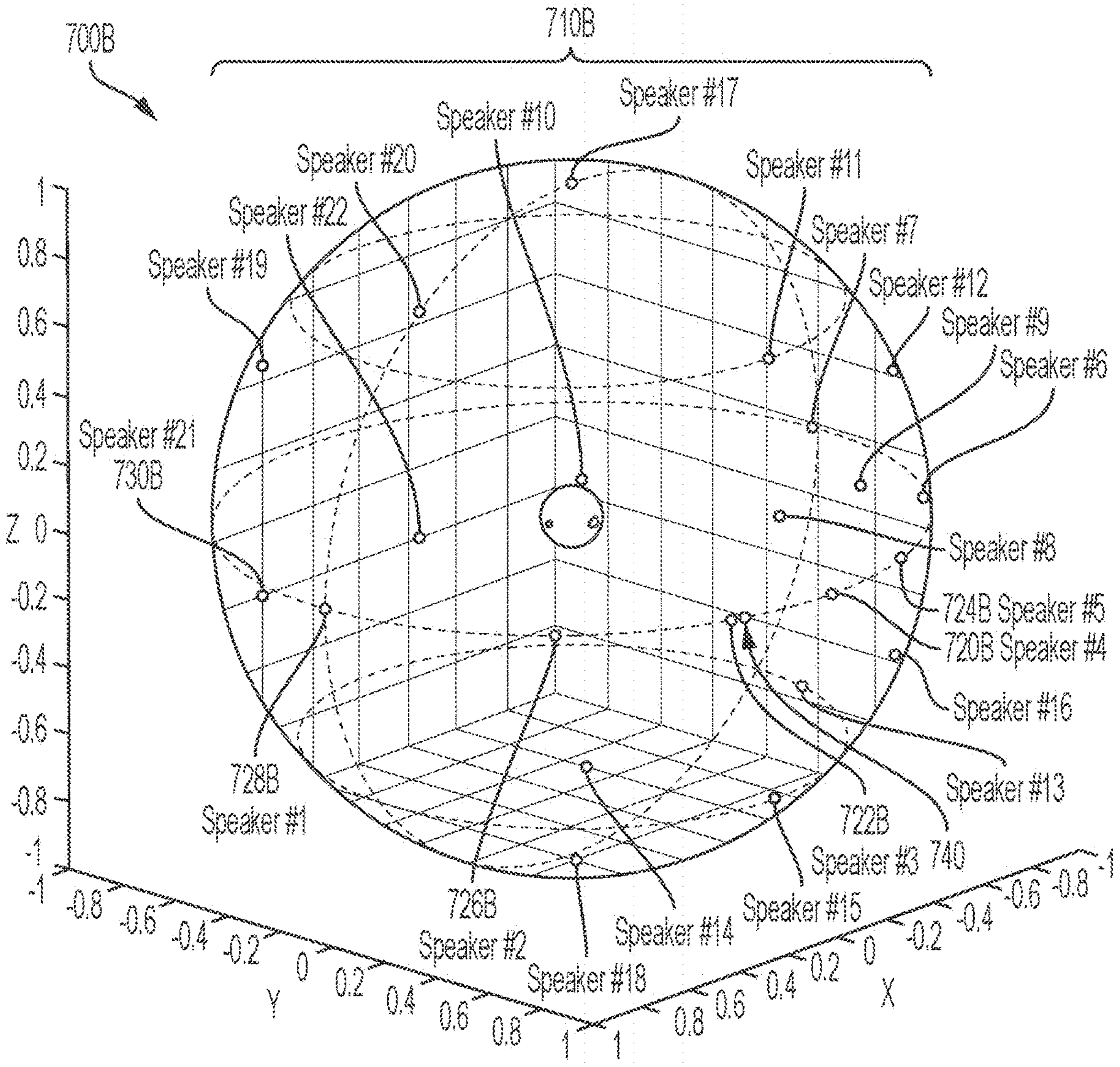

FIG. 7B illustrates an example VSA 700B in which virtual speakers 710B (labeled in the figure as Speaker #1, Speaker #2, and so on) are disposed on the surface of a sphere. VSA 700B may correspond to a VSA referenced by VSA modules 510 or 520 from FIG. 5. VSA 700A and VSA 700B feature the same total number of virtual speakers (corresponding to the same total number of HRTFs). In VSA 700B, unlike VSA 700A in FIG. 7A, virtual speakers 710B are spaced with non-uniform density with respect to azimuth. For example, virtual speaker 720B has an azimuth of 90 degrees and an elevation of 0 degrees. Virtual speaker 722B has an azimuth of 70 degrees and an elevation of 0 degrees. Virtual speaker 724B has an azimuth of 110 degrees and an elevation of 0 degrees. Virtual speaker 726B has an azimuth of 40 degrees and an elevation of 0 degrees. Virtual speaker 728B has an azimuth of 0 degrees and an elevation of 0 degrees.

And virtual speaker 730B has an azimuth of −70 degrees and an elevation of 0 degrees. In VSA 700A, as described above, virtual speakers 720A, 722A, and 724A differ by an azimuthal distance of 45 degrees; however, in VSA 700B, corresponding virtual speakers 720B, 722B, and 724B differ by an azimuthal distance of 20 degrees. This lower azimuthal distance reflects a greater virtual speaker density in this region of the VSA. The azimuthal distance is non-uniform across the VSA: for example, while virtual speaker 722B differs from virtual speaker 720B by an azimuthal distance of 20 degrees, virtual speaker 726B differs from virtual speaker 722B by an azimuthal distance of 30 degrees; and virtual speaker 728B differs from virtual speaker 726B by an azimuthal distance of 40 degrees. This is in contrast to the uniform distance of 45 degrees shown in VSA 700A. In VSA 700B, virtual speaker 730B differs from virtual speaker 728B by an azimuthal distance of 70 degrees—greater than the uniform distance of 45 degrees in VSA 700A and representing a lower virtual speaker density, at that region of VSA 700B, than in VSA 700A.

Figure 8A:
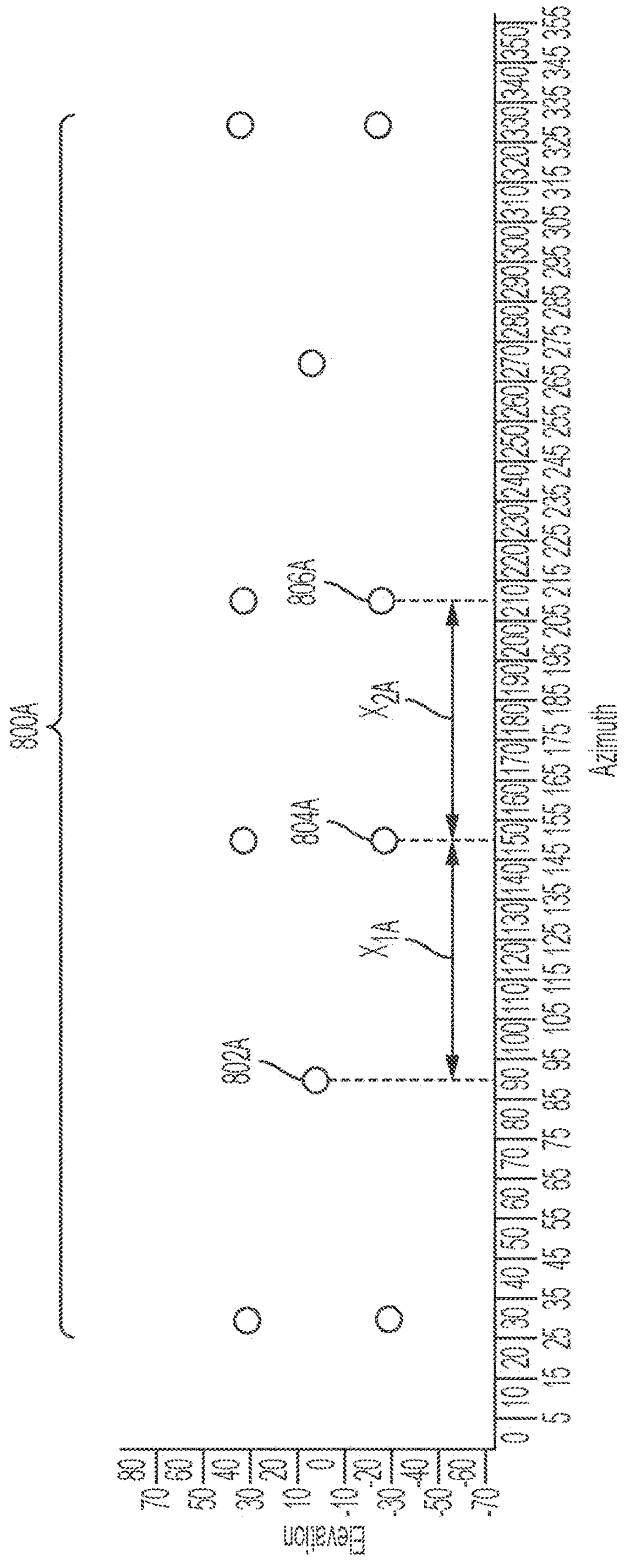
FIGS. 8A-8B illustrate examples of virtual speaker locations, according to some embodiments of the disclosure.
Figure 8B:
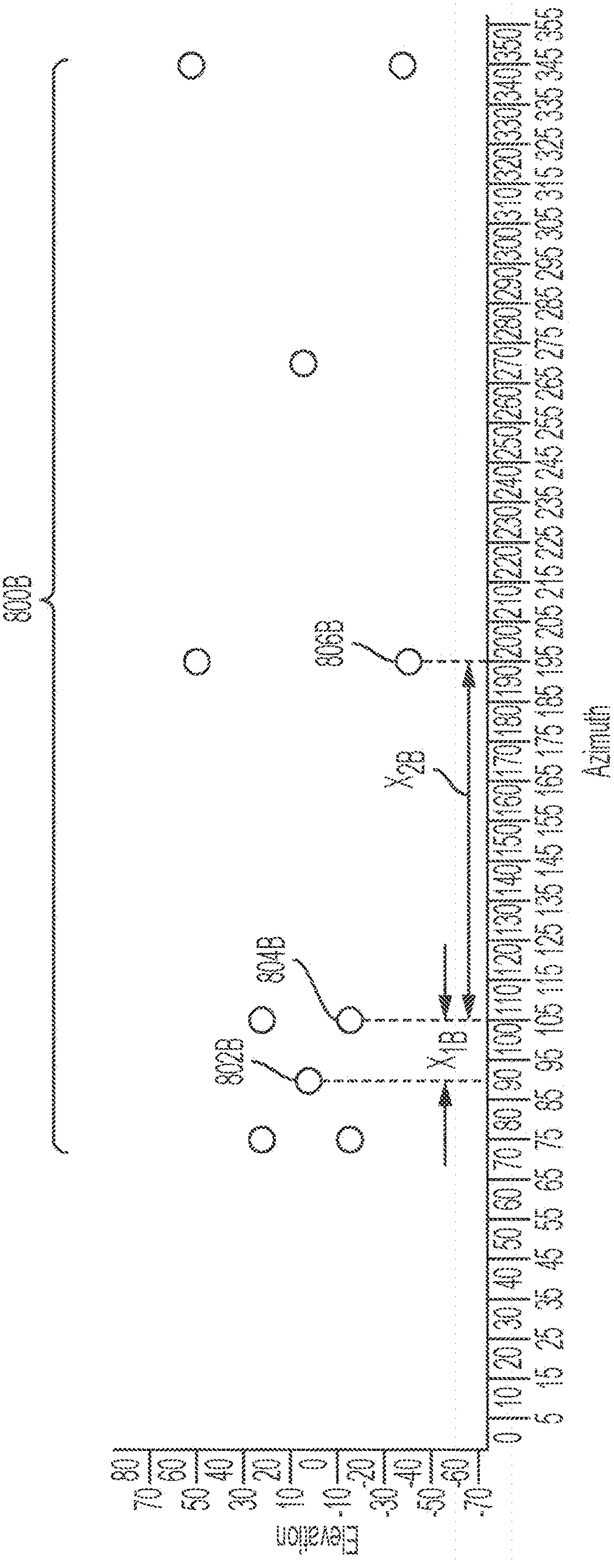

FIGS. 8A and 8B further illustrate the concept of uniform and non-uniform virtual speaker density, respectively. In FIGS. 8A and 8B, points 800A and 800B illustrate VSAs having respective virtual speaker locations. In the figures, the virtual speaker locations are plotted with respect to azimuth (on the horizontal axis) and elevation angle (on the vertical axis). In FIG. 8A, the virtual speaker locations are separated by a uniform azimuthal distance of 60 degrees. For example, virtual speaker 802A differs from virtual speaker 804A by an azimuthal distance $X_{1A}$, equal to 60 degrees; and virtual speaker 806A differs from virtual speaker 804A by an azimuthal distance $X_{2A}$, also equal to 60 degrees. In FIG. 8B, in contrast, the virtual speaker locations exhibit non-uniform density. For example, virtual speaker 802B differs from virtual speaker 804B by an azimuthal distance $X_{1B}$, equal to 15 degrees; and virtual speaker 806B differs from virtual speaker 804B by an azimuthal distance $X_{2B}$, equal to 90 degrees. The distance $X_{1B}$ represents a greater virtual speaker density, while the distance $X_{2B}$ represents a lower virtual speaker density.

For VSAs that exhibit non-uniform virtual speaker densities, such as VSA 700B and VSA 800B, the distances between virtual speakers (e.g. azimuth and/or elevation distances) can be selected in order to optimize an overall expected audio quality of an audio signal that is spatialized and presented to a listener based on the VSA. Improved audio results can be achieved by increasing virtual speaker density in regions of the VSA that are more significant to a listener's audio experience. In order to preserve computational resources, this virtual speaker density in these significant regions can be increased while virtual speaker density in less significant regions of the VSA is reduced. Which regions of the VSA are more significant can depend on multiple factors, and may depend on the individual listener or on a particular application.

Figure 9:
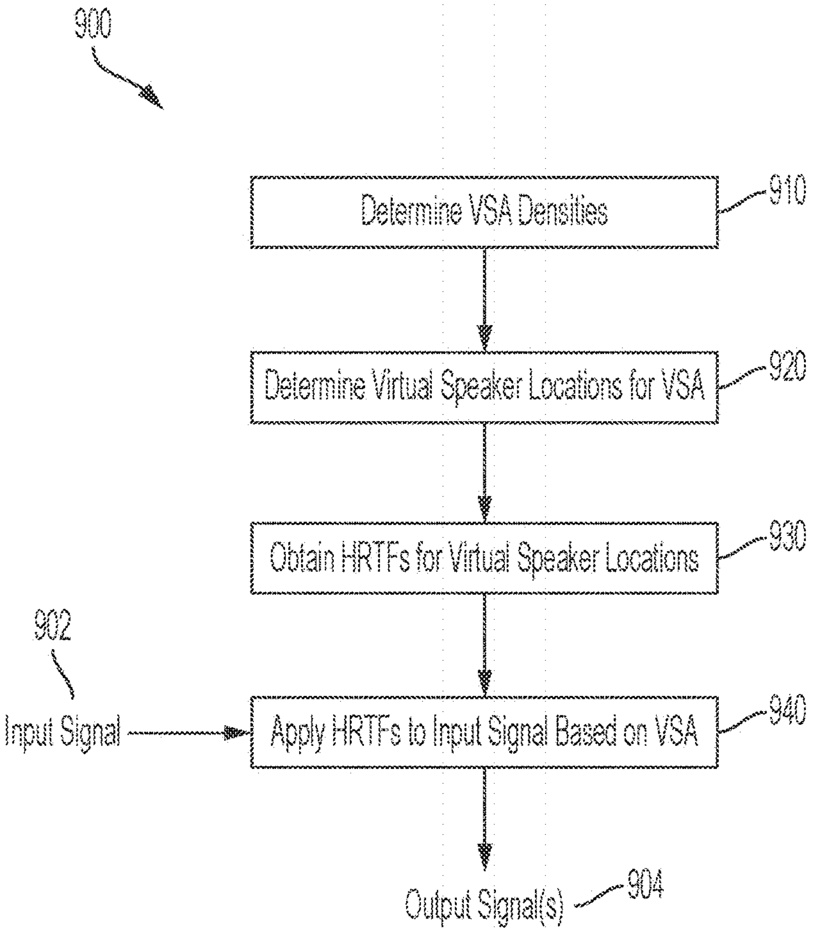
FIG. 9 illustrates an example process for determining and applying an optimized virtual speaker array and applying the optimized virtual speaker array to an audio signal, according to some embodiments of the disclosure.

FIG. 9 shows an example process 900 for determining an optimized VSA and applying the optimized VSA to an input audio signal 902. At stage 910 of the process, one or more virtual speaker densities (or, in some examples, distances between virtual speaker locations) can be determined for a VSA. In some cases, VSA densities can be determined at stage 910 empirically, such as by determining a mean opinion score (MOS) for virtual speakers at various regions of the VSA, and increasing virtual speaker density at regions of the VSA where MOS is insufficiently high. Example techniques for determining MOS are described in S. Crawford, R. Audfray; J.-M. Jot, "Quantifying HRTF Spectral Magnitude Precision in Spatial Computing Applications", 2020 AES International Conference on Audio for Virtual and Augmented Reality (August 2020). Such techniques include measuring the audio quality perceived by a group of trained listeners for a particular virtual speaker location. In some cases, determining virtual speaker locations based on a MOS can result in a VSA with virtual speaker density that is non-uniform (e.g., with respect to azimuth). Virtual speaker locations can also be determined based on one or more of various other factors that can affect which regions of a VSA are relatively significant. These factors can include anatomical characteristics of the listener (e.g., the width of the listener's head, or the dimensions of the pinna of the listener's ear); one or more characteristics of a HRTF; a configuration of listening equipment (e.g., the number and positions of loudspeakers configured to present an audio signal); characteristics of an audio signal (e.g., the signal's spectral composition); an intended application of the VSA (e.g., virtual reality, augmented reality, mixed reality, or a particular software application for any of the above); or characteristics of a virtual environment (e.g., the dimensions of an acoustic space in a virtual environment).

In some cases, VSA densities can be determined at stage 910 based on an evaluation of a HRTF. This approach has several advantages. First, optimized virtual speaker locations can be determined from the HRTF directly without the need for analysis of rendered signals, such as may be required by MOS-based methods. Second, optimized virtual speaker locations can be easily determined for individual listeners, who may have unique HRTFs (owing, for example, to different ear anatomy) and thus benefit from individualized virtual speaker locations, without the need for more computationally expensive methods (e.g., MOS-based methods) that could require iterative analysis of rendered signals.

As explained above, regions of high VSA density, as determined at stage 910, can correspond to regions that are significant with respect to virtual speaker placement. A VSA region can be considered significant if it is difficult to blend between two nearby virtual speakers (e.g., as described with respect to the VSA modules 510 and 520 of FIG. 5) to obtain an output audio signal that is convincingly spatialized. In these regions, additional virtual speakers may be needed to present convincingly spatialized audio. These regions of the VSA may correspond to regions of a HRTF in which the signal amplitude (i.e., the output of the HRTF function) changes considerably or unpredictably over a short angular distance. These regions of change may not be represented accurately by a VSA with insufficient virtual speaker density in those regions. Perceived audio quality can be optimized by increasing the virtual speaker density in regions of the VSA that correspond to regions of change in the HRTF.

Figure 10A:
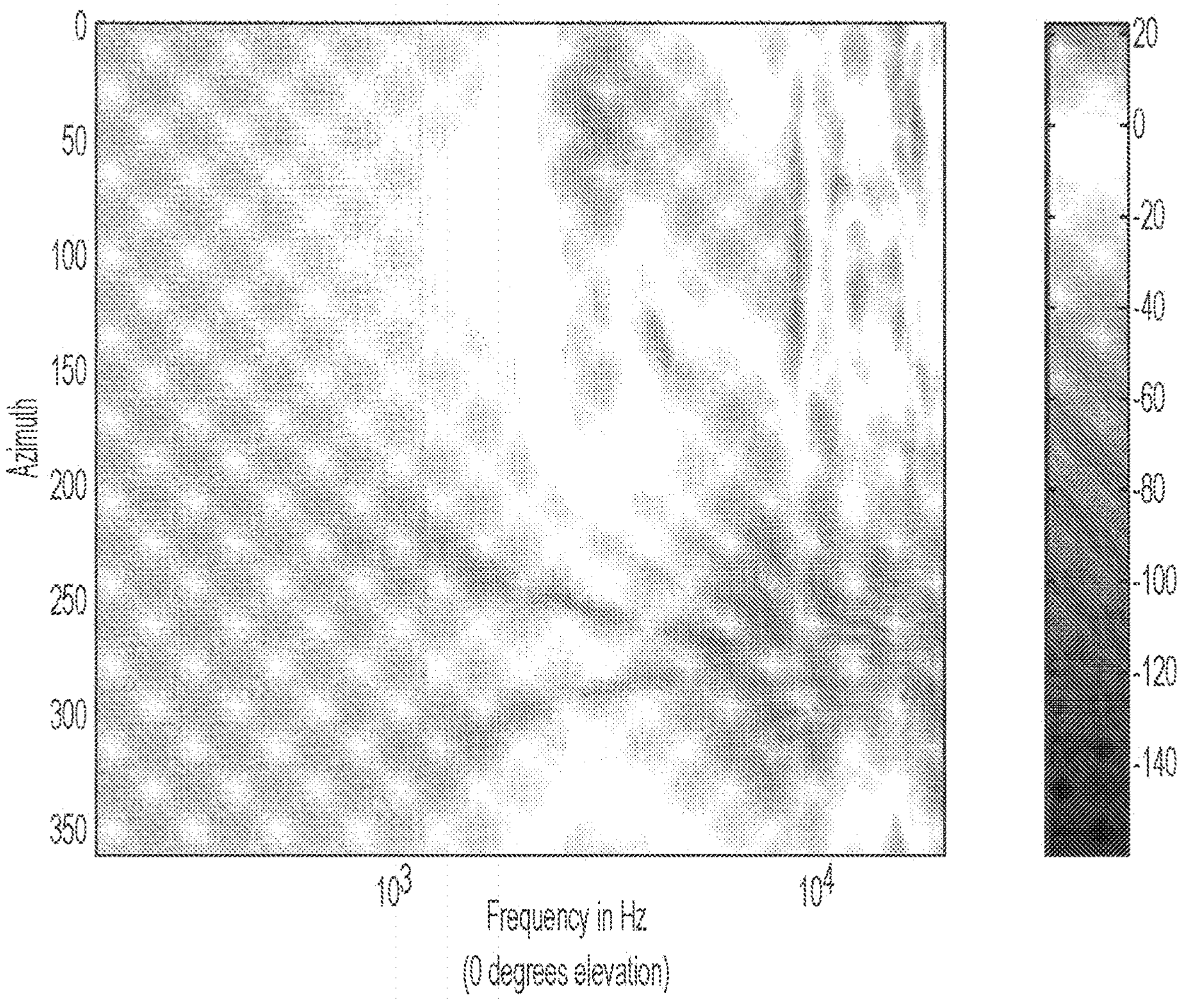
FIGS. 10A-10B illustrate example HRTFs, according to some embodiments of the disclosure.

FIG. 10A illustrates an example HRTF that represents signal amplitude as a function of azimuth and frequency for zero degrees elevation. One way in which virtual speaker densities can be determined is by computing a gradient of the HRTF; a steeper gradient at an azimuth (e.g., at azimuth 250 degrees in the figure across a range of frequencies) indicates that the HRTF changes rapidly in that azimuthal region, and indicates that virtual speaker density should be increased at that azimuth in the VSA. Conversely, a less steep gradient at an azimuth (e.g., at azimuth 340 degrees) indicates that the HRTF changes less rapidly in that azimuthal region, and indicates that the virtual speaker density may be decreased at that azimuth in the VSA.

Not all frequencies of the HRTF may be equally significant. Some frequencies may be more significant than others.

For example, frequencies in the range of 2-4 kHz may be particularly important for voice applications, because those frequencies correspond to common vocal sounds and are critical to intelligently reproducing voice signals. In other applications, particular frequencies (e.g., corresponding to commonly used, or particularly important, audio signals) may be of special significance. It may be desirable to increase virtual speaker density in regions of rapid HRTF change for a specific frequency (or range of frequencies) of interest.

Figure 10B:
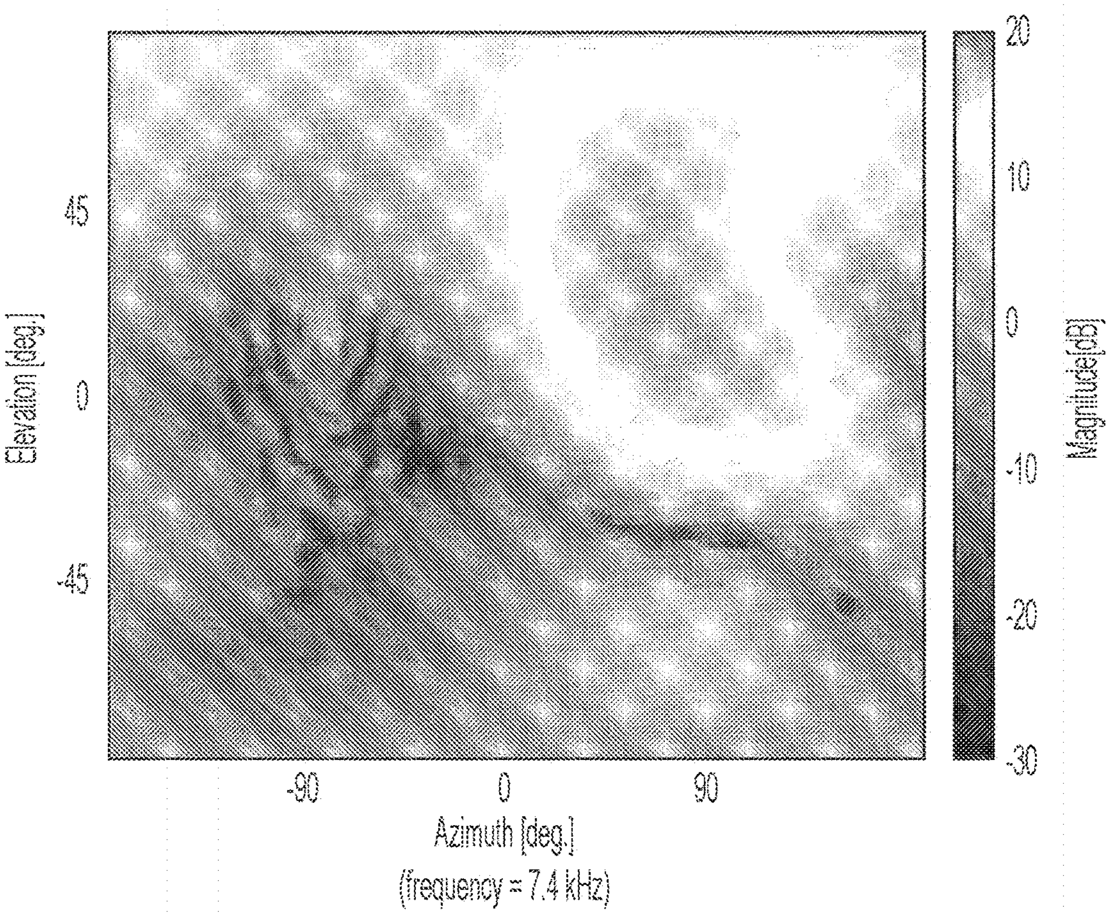

FIG. 10B illustrates an example HRTF that represents signal amplitude as a function of azimuth and elevation for a given frequency of interest (in this example, 7.4 kHz). As with the HRTF shown in FIG. 10A, a rate of change can be determined for the HRTF in FIG. 10B to identify corresponding VSA regions of higher or lower virtual speaker density. In the FIG. 10B example, a gradient can be determined (e.g., via a gradient map) for a set of angular coordinates (azimuth, elevation). A larger gradient magnitude at a particular azimuth and elevation (e.g., at azimuth 90 degrees and elevation −30 degrees in the figure) can indicate that a region of the VSA corresponding to that azimuth and elevation should be associated with a higher virtual speaker density. Conversely, a smaller gradient magnitude at a particular azimuth and elevation (e.g., at azimuth 90 degrees and elevation 15 degrees in the figure) can indicate that a region of the VSA corresponding to that azimuth and elevation should be associated with a lower virtual speaker density. In some cases, the direction of the gradient, not just its magnitude, may be considered when determining virtual speaker density.

In some cases, virtual speaker density may only be of interest for a particular elevation (e.g., 0 degrees). In these cases, a rate of change of the HRTF can be determined as a partial derivative of the HRTF with respect to azimuth at the particular elevation. This technique and other suitable techniques for analyzing rates of change of a HRTF will be familiar to the skilled artisan.

In some examples, a frequency of interest can be determined based on knowledge or analysis of a desired audio application. In the example given above, for instance, 2-4 kHz may be known to be a frequency range of interest for a voice application. In some examples, a frequency of interest can be determined empirically. For instance, an audio output sample can be determined for an application, and spectral analysis performed on the audio output sample to determine which frequency or frequencies dominate for the audio sample. Other techniques for determining a frequency of interest will be apparent to one of skill in the art.

Determining virtual speaker density and/or virtual speaker locations by analyzing a HRTF can be used in combination with MOS techniques described above. For example, HRTF analysis can be used to verify the results of MOS-informed virtual speaker placement, or vice versa. In some cases, MOS techniques can be used to refine results obtained via HRTF analysis, or vice versa.

Referring back to FIG. 9 and process 900, at stage 920, virtual speaker locations for the VSA can be determined based on the virtual speaker densities determined at stage 910 (or, analogously, based on virtual speaker distances determined at stage 910). Examples of this determination are described above with respect to FIG. 8B. Determining a virtual speaker location can be performed based on determining a distance between two virtual speaker locations based on a corresponding density. For example, if it is determined at stage 910 that a first region of the VSA corresponds to a high virtual speaker density, a first virtual speaker belonging to that first region (e.g., 802B in FIG. 8B) can be positioned at a distance (e.g., an azimuthal distance) from a second virtual speaker (e.g., 804B in FIG. 8B), where the distance is relatively small to correspond to the high virtual speaker density. This azimuthal distance can correspond, for example, to distance $X_{1B}$ in FIG. 8B. Similarly, if it is determined at stage 910 that a second region of the VSA corresponds to a low virtual speaker density, a third virtual speaker belonging to that second region (e.g., 806B in FIG. 8B) can be positioned at a distance (e.g., an azimuthal distance) from the second virtual speaker, where the distance is relatively large to correspond to the low virtual speaker density. This azimuthal distance can correspond, for example, to distance $X_{2B}$ in FIG. 8B, which is larger than distance $X_{1B}$. This process can be performed based on one or more of azimuth, elevation, distance, or any other suitable dimension or combination of dimensions.

At stage 930, a HRTF is identified (e.g., obtained or determined) for each virtual speaker of the VSA. That is, a HRTF can be identified for a particular virtual speaker location (e.g., a location corresponding to a particular azimuth, elevation, and/or distance). In some examples, a generic HRTF (i.e., one designed to be acceptable to a group of listeners) can be used for the above processes. The SADIE (Spatial Audio for domestic Interactive Entertainment) binaural database is one example of a set of generic HRTFs that can be used for this purpose. However, many groups of listeners report suboptimal acoustic performance using generic HRTFs; improved acoustic performance can be obtained by utilizing a HRTF that is specific to the listener in question. For a specific listener, custom HRTFs designed specifically for that listener typically will improve the quality of spatialized audio for that listener, with the potential downside that the custom HRTFs may have limited applicability for other listeners.

Stages 910, 920, and/or 930 can be performed multiple times to generate unique VSAs. For example, stages 910, 920, and 930 can be performed a first time to generate a left ear VSA; and stages 910, 920, and 930 can be performed a second time to generate a right ear VSA. The left ear VSA and the right ear VSA can be provided as input to stage 940 (e.g., as 510 and 520 of process 500 in FIG. 5), which can be used to provide left and right audio output signals 904, based on the left ear VSA and the right ear VSA, respectively.

The optimized VSA or VSAs generated in steps 910, 920, and/or 930 are provided to a process 940. Process 940 applies the HRTFs obtained at stage 930 to an input audio signal 902, based on the optimized VSA or VSAs generated in steps 910, 920, and/or 930, to produce output signal(s) 904. Process 940 may correspond to process 500 shown in FIG. 5 and described above. Output signal(s) 904 may be presented to a listener. Output signals 904 represent filtered audio signals that, when heard by the listener, create the perception that input signal 902 emanates from a particular virtual sound source location.

Examples below describe techniques for presenting spatialized audio signals, such as audio signals spatialized based on a VSA as described above, via a wearable head device. A head coordinate system may be used for computing acoustic propagation from an audio object to ears of a listener. A device coordinate system may be used by a tracking device (such as one or more sensors of a wearable head device in an augmented reality system, such as described above) to track position and orientation of a head of a listener. In some embodiments, the head coordinate system and the device coordinate system may be different.

A center of the head of the listener may be used as the origin of the head coordinate system, and may be used to reference a position of the audio object relative to the listener with a forward direction of the head coordinate system defined as going from the center of the head of the listener to a horizon in front of the listener. In some embodiments, an arbitrary point in space may be used as the origin of the device coordinate system. In some embodiments, the origin of the device coordinate system may be a point located in between optical lenses of a visual projection system of the tracking device. The origin (either of the listener or of the device coordinate system) can correspond to the center point of a VSA as described above. In some embodiments, the forward direction of the device coordinate system may be referenced to the tracking device itself, and dependent on the position of the tracking device on the head of the listener. In some embodiments, the tracking device may have a non-zero pitch (i.e. be tilted up or down) relative to a horizontal plane of the head coordinate system, leading to a misalignment between the forward direction of the head coordinate system and the forward direction of the device coordinate system. Virtual speaker coordinates (e.g., azimuth and elevation) can be expressed relative to the forward direction.

In some embodiments, the difference between the head coordinate system and the device coordinate system may be compensated for by applying a transformation to the position of the audio object relative to the head of the listener. In some embodiments, the difference in the origin of the head coordinate system and the device coordinate system may be compensated for by translating the position of the audio objects relative to the head of the listener by an amount equal to the distance between the origin of the head coordinate system and the origin of the device coordinate system reference points in three dimensions (e.g., x, y, and z). In some embodiments, the difference in angles between the head coordinate system axes and the device coordinate system axes may be compensated for by applying a rotation to the position of the audio object relative to the head of the listener. For instance, if the tracking device is tilted downward by N degrees, the position of the audio object could be rotated downward by N degrees prior to rendering the audio output for the listener. In some embodiments, audio object rotation compensation may be applied before audio object translation compensation. In some embodiments, compensations (e.g., rotation, translation, scaling, and the like) may be taken together in a single transformation including all the compensations (e.g., rotation, translation, scaling, and the like).

Figure 11A:
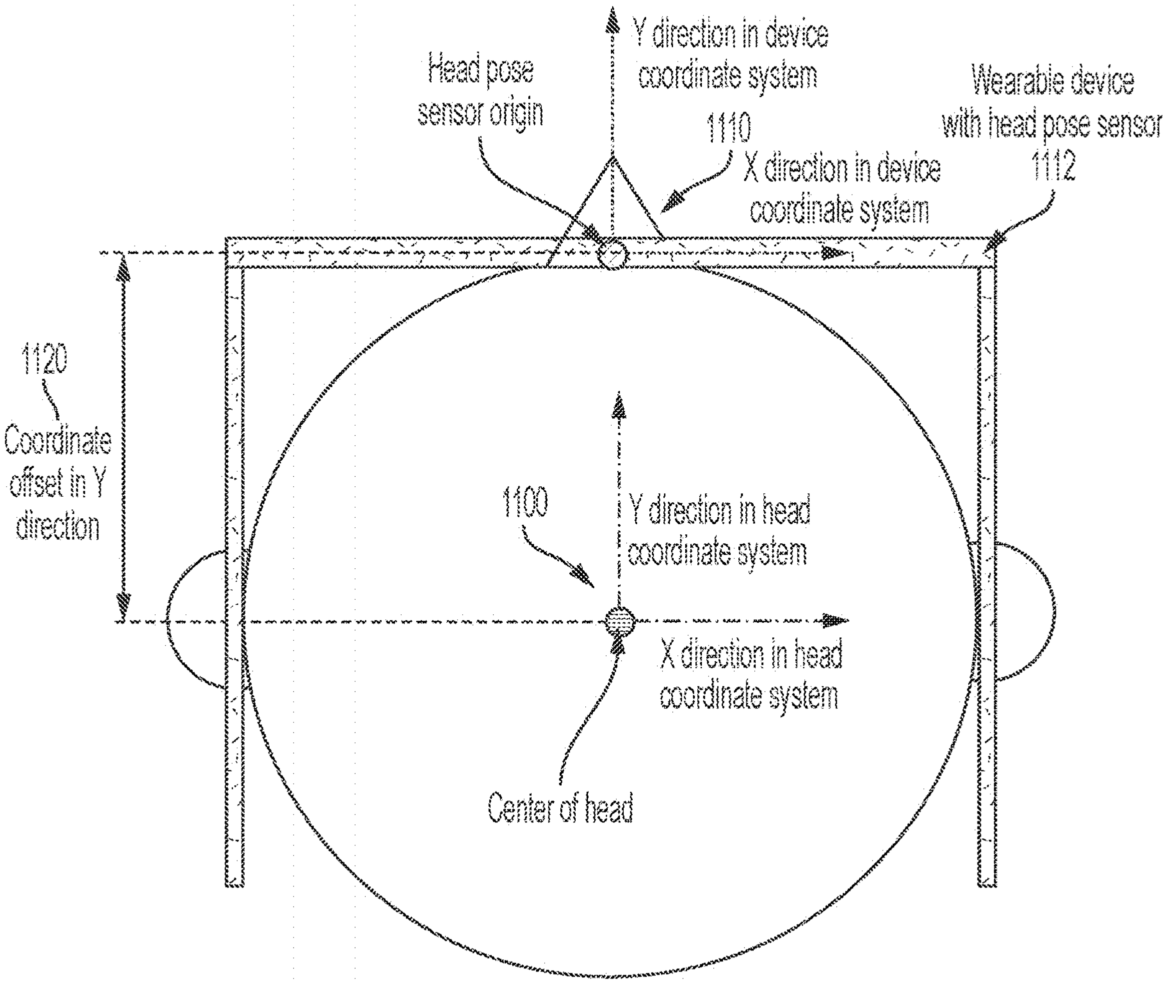
FIGS. 11A-11D illustrate examples of a head coordinate system corresponding to a user and a device coordinate system corresponding to a device, according to some embodiments of the disclosure.
Figure 11B:
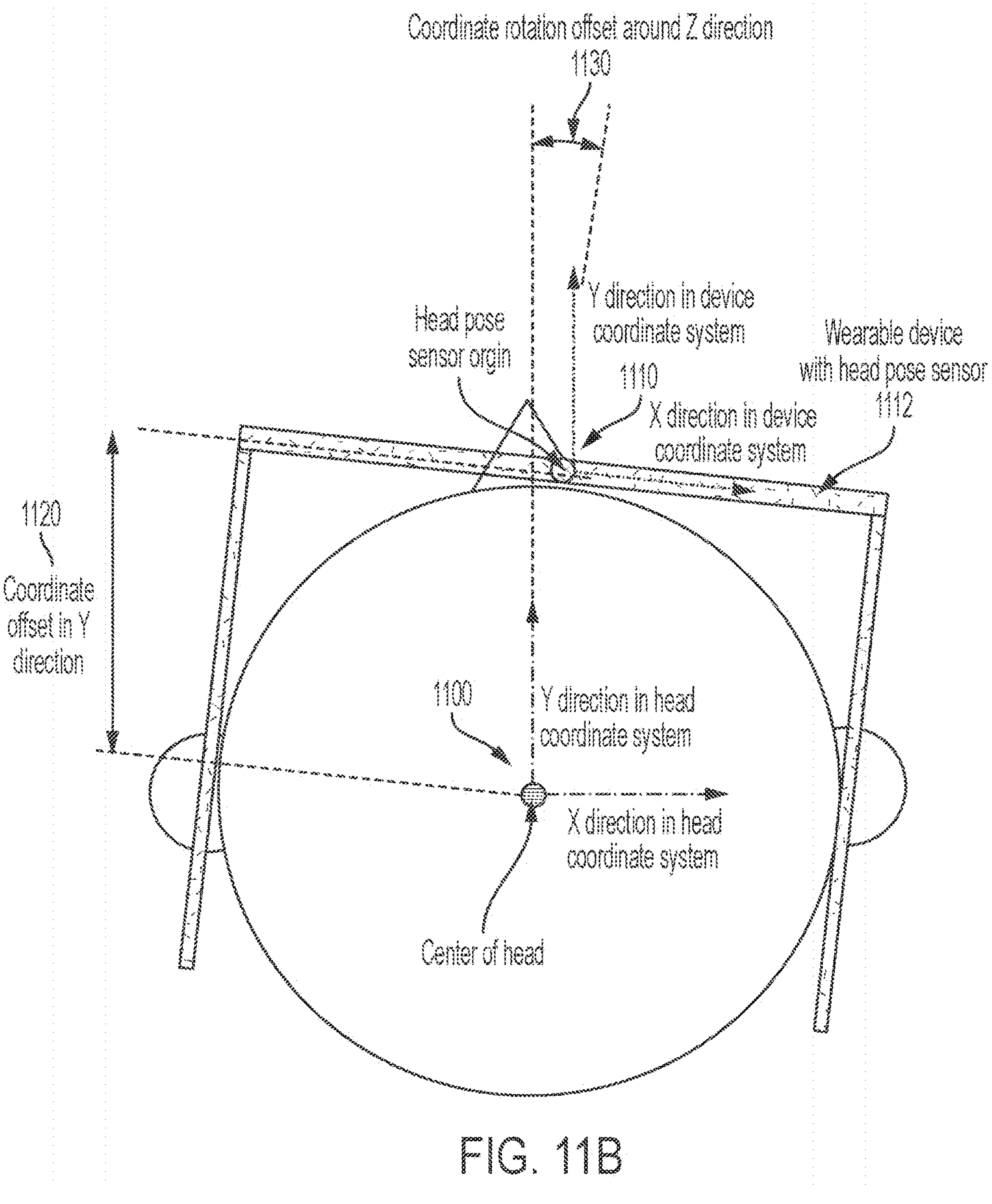
Figure 11C:
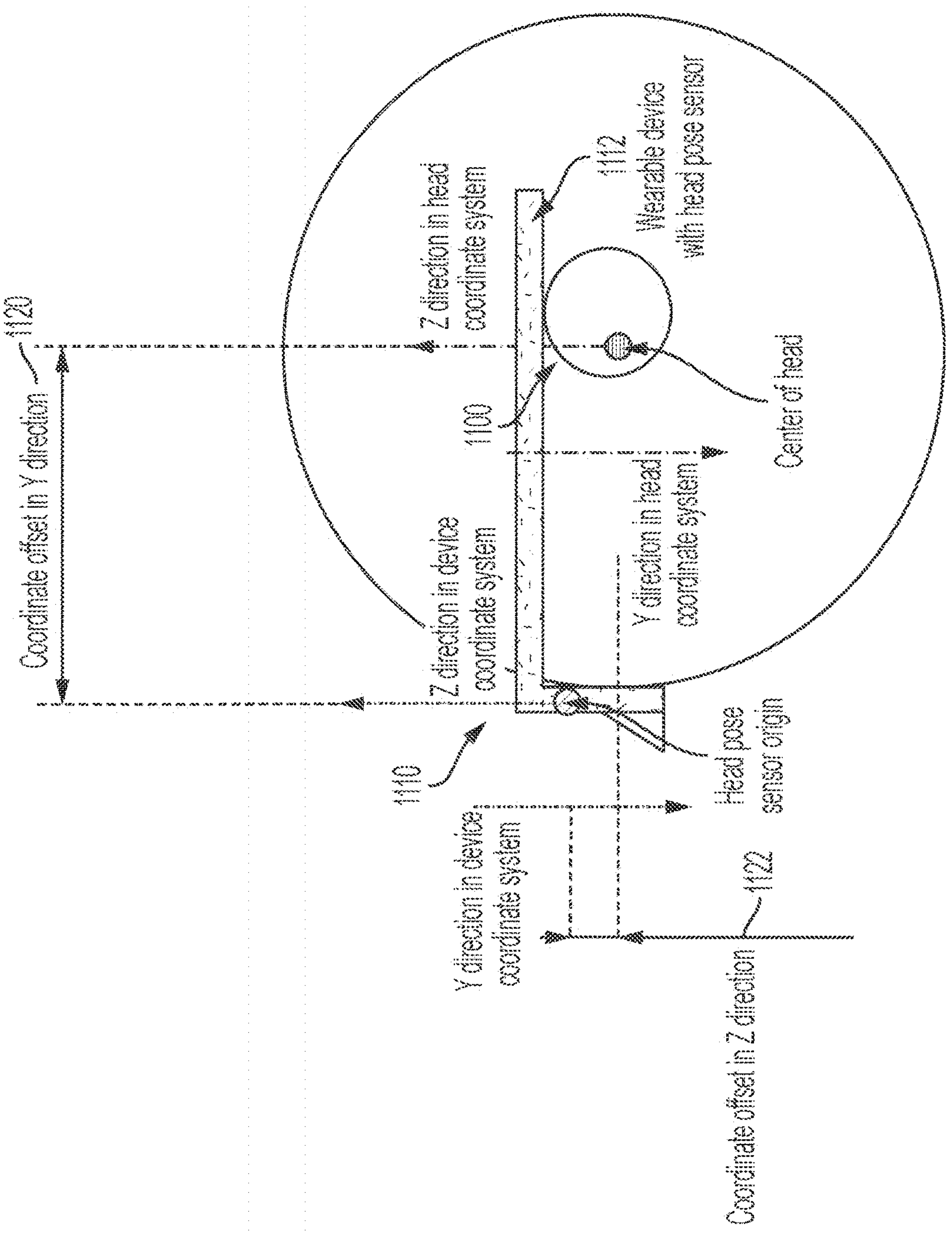
Figure 11D:
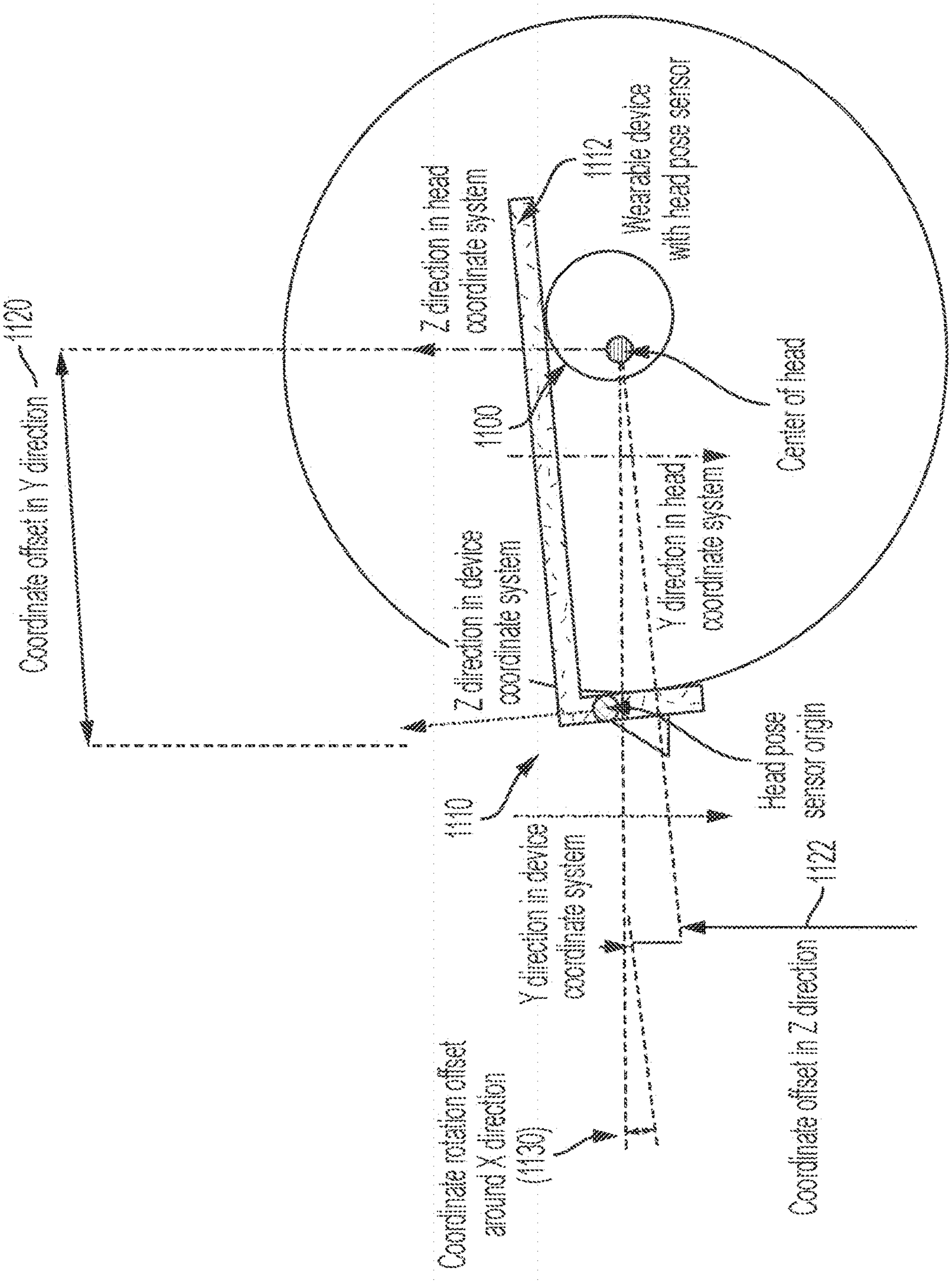

FIGS. 11A-11D illustrate examples of a head coordinate system 1100 corresponding to a user and a device coordinate system 1110 corresponding to a device 1112, such as a head-mounted augmented reality device as described above, according to embodiments. FIG. 11A illustrates a top view of an example where there is a frontal translation offset 1120 between the head coordinate system 1100 and the device coordinate system 1110. FIG. 11B illustrates a top view of an example where there is a frontal translation offset 1120 between the head coordinate system 1100 and the device coordinate system 1110, as well as a rotation 1130 around a vertical axis. FIG. 11C illustrates a side view of an example where there are both a frontal translation offset 1120 and a vertical translation offset 1122 between the head coordinate system 1100 and the device coordinate system 1110. FIG. 11D shows a side view of an example where there are both a frontal translation offset 1120 and a vertical translation offset 1122 between the head coordinate system 1100 and the device coordinate system 1110, as well as a rotation 1130 around a left/right horizontal axis.

In some embodiments, such as in those depicted in FIGS. 11A-11D, the system may compute the offset between the head coordinate system 1100 and the device coordinate system 1110 and compensate accordingly. The system may use sensor data, for example, eye-tracking data from one or more optical sensors, long term gravity data from one or more inertial measurement units, bending data from one or more bending/head-size sensors, and the like. Such data can be provided by one or more sensors of an augmented reality system, such as described above.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may include the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

According to some disclosed embodiments, a method comprises determining a location of a first virtual speaker of a first virtual speaker array. A first virtual speaker density may be determined. A location of a second virtual speaker of the first virtual speaker array may be determined based on the first virtual speaker density. A source location in a virtual environment may be determined for an audio signal. A virtual speaker of the first virtual speaker array may be selected based on the source location and based further on a position or an orientation of a listener in the virtual environment. A head-related transfer function (HRTF) corresponding to the selected virtual speaker of the first virtual speaker array may be identified. The HRTF may be applied to the audio signal to produce a first filtered audio signal. The first filtered audio signal may be presented to the listener via a first speaker. According to some disclosed embodiments, the method further comprises determining a second virtual speaker density, the second virtual speaker density greater than the first virtual speaker density; and determining, based on the second virtual speaker density, a location of a third virtual speaker of the first virtual speaker array; wherein a distance between the location of the first virtual speaker and the location of the second virtual speaker is greater than a distance between the location of the first virtual speaker and the location of the third virtual speaker. According to some disclosed embodiments, the first virtual speaker array corresponds to a first ear of the listener; the first speaker corresponds to the first ear; and the method further comprises: selecting a virtual speaker of a second virtual speaker array based on the source location and based further on the position or the orientation of the listener in the virtual environment, the second virtual speaker array corresponding to a second ear of the listener; identifying a second HRTF corresponding to the selected virtual speaker of the second virtual speaker array; applying the second HRTF to the audio signal to produce a second filtered audio signal; and concurrently with presenting the first filtered audio signal to the listener via the first speaker, presenting the second filtered audio signal to the listener via a second speaker corresponding to the second ear. According to some disclosed embodiments, the first speaker comprises a first speaker of a wearable head device; the second speaker comprises a second speaker of the wearable head device; and selecting the virtual speaker of the first virtual speaker array comprises identifying, via a sensor of the wearable head device, the position or the orientation of the listener in the virtual environment. According to some disclosed embodiments, the method further comprises: determining a third virtual speaker density, the third virtual speaker density different from the first virtual speaker density and different from the second virtual speaker density; and determining, based on the third virtual speaker density, a location of the selected virtual speaker of the second virtual speaker array. According to some disclosed embodiments, the first virtual speaker density is determined based on the HRTF. According to some disclosed embodiments, the method further comprises identifying a first frequency; and the first virtual speaker density is determined based on a first rate of change of the HRTF with respect to the first frequency.

According to some disclosed embodiments, a system comprises a wearable head device comprising one or more sensors; a first speaker; and one or more processors configured to perform a method. The method can comprise determining a location of a first virtual speaker of a first virtual speaker array. A first virtual speaker density may be determined. A location of a second virtual speaker of the first virtual speaker array may be determined based on the first virtual speaker density. A source location in a virtual environment may be determined for an audio signal. A virtual speaker of the first virtual speaker array may be selected based on the source location and based further on a position or an orientation of a listener in the virtual environment, said position or orientation determined based on an output of the one or more sensors. A head-related transfer function (HRTF) corresponding to the selected virtual speaker of the first virtual speaker array may be identified. The HRTF may be applied to the audio signal to produce a first filtered audio signal. The first filtered audio signal may be presented to the listener via the first speaker. According to some disclosed embodiments, the method further comprises determining a second virtual speaker density, the second virtual speaker density greater than the first virtual speaker density; and determining, based on the second virtual speaker density, a location of a third virtual speaker of the first virtual speaker array; wherein a distance between the location of the first virtual speaker and the location of the second virtual speaker is greater than a distance between the location of the first virtual speaker and the location of the third virtual speaker. According to some disclosed embodiments, the first virtual speaker array corresponds to a first ear of the listener; the first speaker corresponds to the first ear; the system further comprises a second speaker corresponding to a second ear of the listener; and the method further comprises: selecting a virtual speaker of a second virtual speaker array based on the source location and based further on the position or the orientation of the listener in the virtual environment, the second virtual speaker array corresponding to the second ear; identifying a second HRTF corresponding to the selected virtual speaker of the second virtual speaker array; applying the second HRTF to the audio signal to produce a second filtered audio signal; and concurrently with presenting the first filtered audio signal to the listener via the first speaker, presenting the second filtered audio signal to the listener via the second speaker. According to some disclosed embodiments, the method further comprises: determining a third virtual speaker density, the third virtual speaker density different from the first virtual speaker density and different from the second virtual speaker density; and determining, based on the third virtual speaker density, a location of the selected virtual speaker of the second virtual speaker array. According to some disclosed embodiments, the first virtual speaker density is determined based on the HRTF. According to some disclosed embodiments, the method further comprises identifying a first frequency; and the first virtual speaker density is determined based on a first rate of change of the HRTF with respect to the first frequency.

According to some disclosed embodiments, a non-transitory computer-readable medium stores instructions which, when executed by one or more processors, causes the one or more processors to perform a method. The method can comprise determining a location of a first virtual speaker of a first virtual speaker array. A first virtual speaker density may be determined. A location of a second virtual speaker of the first virtual speaker array may be determined based on the first virtual speaker density. A source location in a virtual environment may be determined for an audio signal. A virtual speaker of the first virtual speaker array may be selected based on the source location and based further on a position or an orientation of a listener in the virtual environment. A head-related transfer function (HRTF) corresponding to the selected virtual speaker of the first virtual speaker array may be identified. The HRTF may be applied to the audio signal to produce a first filtered audio signal. The first filtered audio signal may be presented to the listener via a first speaker. According to some disclosed embodiments, the method further comprises determining a second virtual speaker density, the second virtual speaker density greater than the first virtual speaker density; and determining, based on the second virtual speaker density, a location of a third virtual speaker of the first virtual speaker array; wherein a distance between the location of the first virtual speaker and the location of the second virtual speaker is greater than a distance between the location of the first virtual speaker and the location of the third virtual speaker. According to some disclosed embodiments, the first virtual speaker array corresponds to a first ear of the listener; the first speaker corresponds to the first ear; and the method further comprises: selecting a virtual speaker of a second virtual speaker array based on the source location and based further on the position or the orientation of the listener in the virtual environment, the second virtual speaker array corresponding to a second ear of the listener; identifying a second HRTF corresponding to the selected virtual speaker of the second virtual speaker array; applying the second HRTF to the audio signal to produce a second filtered audio signal; and concurrently with presenting the first filtered audio signal to the listener via the first speaker, presenting the second filtered audio signal to the listener via a second speaker corresponding to the second ear. According to some disclosed embodiments, the first speaker comprises a first speaker of a wearable head device; the second speaker comprises a second speaker of the wearable head device; and selecting the virtual speaker of the first virtual speaker array comprises identifying, via a sensor of the wearable head device, the position or the orientation of the listener in the virtual environment. According to some disclosed embodiments, the method further comprises: determining a third virtual speaker density, the third virtual speaker density different from the first virtual speaker density and different from the second virtual speaker density; and determining, based on the third virtual speaker density, a location of the selected virtual speaker of the second virtual speaker array. According to some disclosed embodiments, the first virtual speaker density is determined based on the HRTF. According to some disclosed embodiments, the method further comprises identifying a first frequency; and the first virtual speaker density is determined based on a first rate of change of the HRTF with respect to the first frequency.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

What is claimed is:

1. A method comprising:

determining a location of a first virtual speaker of a first virtual speaker array, the first virtual speaker array corresponding to a first ear of a listener in a virtual environment;

determining a first virtual speaker density;

determining a location of a second virtual speaker of the first virtual speaker array based on the first virtual speaker density;

determining, for an audio signal, a source location in the virtual environment;

selecting a virtual speaker of the first virtual speaker array based on the source location and based further on a position or an orientation of the listener in the virtual environment;

identifying a first head-related transfer function (HRTF) corresponding to the selected virtual speaker of the first virtual speaker array;

applying the first HRTF to the audio signal to produce a first filtered audio signal;

selecting a virtual speaker of a second virtual speaker array based on the source location and based further on the position or the orientation of the listener in the virtual environment, the second virtual speaker array corresponding to a second ear of the listener;

identifying a second HRTF corresponding to the selected virtual speaker of the second virtual speaker array;

applying the second HRTF to the audio signal to produce a second filtered audio signal;

determining a third virtual speaker density, the third virtual speaker density different from the first virtual speaker density and different from a second virtual speaker density; and determining, based on the third virtual speaker density, a location of the selected second virtual speaker of the second virtual speaker array;

presenting the first filtered audio signal to the listener via a first speaker corresponding to the first ear; and concurrently with presenting the first filtered audio signal to the listener via the first speaker, presenting the second filtered audio signal to the listener via a second speaker corresponding to the second ear.

2. The method of claim 1, further comprising:

determining the second virtual speaker density, the second virtual speaker density greater than the first virtual speaker density; and determining, based on the second virtual speaker density, a location of a third virtual speaker of the first virtual speaker array;

wherein:

a distance between the location of the first virtual speaker and the location of the second virtual speaker is greater than a distance between the location of the first virtual speaker and the location of the third virtual speaker.

3. The method of claim 1, wherein:

the first speaker comprises a first speaker of a wearable head device;

the second speaker comprises a second speaker of the wearable head device; and selecting the virtual speaker of the first virtual speaker array comprises identifying, via a sensor of the wearable head device, the position or the orientation of the listener in the virtual environment.

4. The method of claim 1, wherein the first virtual speaker density is determined based on the first HRTF.

5. The method of claim 3, wherein:

the method further comprises identifying a first frequency; and the first virtual speaker density is determined based on a first rate of change of the first HRTF with respect to the first frequency.

6. A system comprising:

a wearable head device comprising one or more sensors;

a first speaker corresponding to a first ear of a listener in a virtual environment;

a second speaker corresponding to a second ear of the listener; and one or more processors configured to perform a method comprising:

determining a location of a first virtual speaker of a first virtual speaker array, the first virtual speaker corresponding to the first ear of the listener;

determining a first virtual speaker density;

determining a location of a second virtual speaker of the first virtual speaker array based on the first virtual speaker density;

determining, for an audio signal, a source location in the virtual environment;

selecting a virtual speaker of the first virtual speaker array based on the source location and based further on a position or an orientation of the listener in the virtual environment, said position or orientation determined based on an output of the one or more sensors;

identifying a first head-related transfer function (HRTF) corresponding to the selected virtual speaker of the first virtual speaker array;

applying the first HRTF to the audio signal to produce a first filtered audio signal;

selecting a virtual speaker of a second virtual speaker array based on the source location and based further on the position or the orientation of the listener in the virtual environment, the second virtual speaker array corresponding to the second ear;

identifying a second HRTF corresponding to the selected virtual speaker of the second virtual speaker array;

applying the second HRTF to the audio signal to produce a second filtered audio signal;

determining a third virtual speaker density, the third virtual speaker density different from the first virtual speaker density and different from a second virtual speaker density; and determining, based on the third virtual speaker density, a location of the selected virtual speaker of the second virtual speaker array;

presenting the first filtered audio signal to the listener via the first speaker; and concurrently with presenting the first filtered audio signal to the listener via the first speaker, presenting the second filtered audio signal to the listener via the second speaker.

7. The system of claim 6, wherein the method further comprises:

determining the second virtual speaker density, the second virtual speaker density greater than the first virtual speaker density; and determining, based on the second virtual speaker density, a location of a third virtual speaker of the first virtual speaker array;

wherein:

a distance between the location of the first virtual speaker and the location of the second virtual speaker is greater than a distance between the location of the first virtual speaker and the location of the third virtual speaker.

8. The system of claim 6, wherein the first virtual speaker density is determined based on the first HRTF.

9. The system of claim 8, wherein:

the method further comprises identifying a first frequency; and the first virtual speaker density is determined based on a first rate of change of the first HRTF with respect to the first frequency.

10. A non-transitory computer-readable medium storing instructions which, when executed by one or more processors, cause the one or more processors to perform a method comprising:

determining a location of a first virtual speaker of a first virtual speaker array, the first virtual speaker array corresponding to a first ear of a listener in a virtual environment;

determining a first virtual speaker density;

determining a location of a second virtual speaker of the first virtual speaker array based on the first virtual speaker density;

determining, for an audio signal, a source location in the virtual environment;

selecting a virtual speaker of the first virtual speaker array based on the source location and based further on a position or an orientation of the listener in the virtual environment;

identifying a first head-related transfer function (HRTF) corresponding to the selected virtual speaker of the first virtual speaker array;

applying the first HRTF to the audio signal to produce a first filtered audio signal;

selecting a virtual speaker of a second virtual speaker array based on the source location and based further on the position or the orientation of the listener in the virtual environment, the second virtual speaker array corresponding to a second ear of the listener;

identifying a second HRTF corresponding to the selected virtual speaker of the second virtual speaker array;

applying the second HRTF to the audio signal to produce a second filtered audio signal;

determining a third virtual speaker density, the third virtual speaker density different from the first virtual speaker density and different from a second virtual speaker density; and determining, based on the third virtual speaker density, a location of the selected virtual speaker of the second virtual speaker array;

presenting the first filtered audio signal to the listener via a first speaker corresponding to the first ear; and concurrently with presenting the first filtered audio signal to the listener via the first speaker, presenting the second filtered audio signal to the listener via a second speaker corresponding to the second ear.

11. The non-transitory computer-readable medium of claim 10, wherein the method further comprises:

determining the second virtual speaker density, the second virtual speaker density greater than the first virtual speaker density; and determining, based on the second virtual speaker density, a location of a third virtual speaker of the first virtual speaker array;

wherein:

a distance between the location of the first virtual speaker and the location of the second virtual speaker is greater than a distance between the location of the first virtual speaker and the location of the third virtual speaker.

12. The non-transitory computer-readable medium of claim 10, wherein:

the first speaker comprises a first speaker of a wearable head device;

the second speaker comprises a second speaker of the wearable head device; and selecting the virtual speaker of the first virtual speaker array comprises identifying, via a sensor of the wearable head device, the position or the orientation of the listener in the virtual environment.

13. The non-transitory computer-readable medium of claim 10, wherein the first virtual speaker density is determined based on the first HRTF.

14. The non-transitory computer-readable medium of claim 13, wherein:

the method further comprises identifying a first frequency; and the first virtual speaker density is determined based on a first rate of change of the first HRTF with respect to the first frequency.

* * * * *